United States Patent
Bergqvist et al.

(10) Patent No.: US 11,985,555 B2
(45) Date of Patent: May 14, 2024

(54) BEAM LIMITATIONS FOR RACH-LESS ACCESS

(71) Applicant: Telefonaktiebolaget LM Ericsson (publ), Stockholm (SE)

(72) Inventors: Jens Bergqvist, Linköping (SE); Johan Rune, Lidingö (SE); Oscar Ohlsson, Stockholm (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 359 days.

(21) Appl. No.: 17/429,401

(22) PCT Filed: Dec. 10, 2019

(86) PCT No.: PCT/SE2019/051259
§ 371 (c)(1),
(2) Date: Aug. 9, 2021

(87) PCT Pub. No.: WO2020/167185
PCT Pub. Date: Aug. 20, 2020

(65) Prior Publication Data
US 2022/0150777 A1    May 12, 2022

Related U.S. Application Data

(60) Provisional application No. 62/805,852, filed on Feb. 14, 2019.

(51) Int. Cl.
*H04W 36/00* (2009.01)
*H04B 7/08* (2006.01)
*H04W 72/23* (2023.01)

(52) U.S. Cl.
CPC ........ *H04W 36/0072* (2013.01); *H04B 7/088* (2013.01); *H04W 72/23* (2023.01)

(58) Field of Classification Search
CPC ....... H04W 36/0072; H04W 36/00725; H04W 36/0077; H04W 36/0079; H04W 36/0083; H04W 72/23
See application file for complete search history.

(56) References Cited

U.S. PATENT DOCUMENTS

2010/0232382 A1* 9/2010 Gauvreau ............. H04W 72/21
370/329
2011/0028171 A1* 2/2011 Guo ....................... H04L 5/0053
455/502

(Continued)

OTHER PUBLICATIONS

International Search Report and Written Opinion dated Feb. 17, 2020 for International Application No. PCT/SE2019/051259 filed Dec. 10, 2019, consisting of 13-pages.

(Continued)

*Primary Examiner* — Jenee Holland
(74) *Attorney, Agent, or Firm* — Weisberg I.P. Law, P.A.

(57) ABSTRACT

A method by a user equipment in a wireless communication system includes receiving an access command from a source node, the access command instructing the UE to access a target cell and including an access configuration specifying an access method without random access and one or more valid target cell beams for which the access configuration is valid at the target cell, and accessing the target cell in response to the access command.

23 Claims, 16 Drawing Sheets

(56) References Cited

U.S. PATENT DOCUMENTS

| | | | |
|---|---|---|---|
| 2011/0134757 A1* | 6/2011 | Lin | H04W 74/0833 370/241 |
| 2012/0302240 A1* | 11/2012 | Tamaki | H04W 36/08 455/436 |
| 2015/0208414 A1* | 7/2015 | Ji | H04W 72/0453 455/454 |
| 2016/0381611 A1* | 12/2016 | Uchino | H04W 74/0833 370/331 |
| 2017/0041841 A1* | 2/2017 | Pedersen | H04W 36/08 |
| 2017/0127334 A1* | 5/2017 | Park | H04L 5/0055 |
| 2017/0257780 A1* | 9/2017 | Ryoo | H04B 7/0617 |
| 2018/0020382 A1* | 1/2018 | Kim | H04W 48/02 |
| 2018/0020472 A1* | 1/2018 | Lin | H04W 36/0016 |
| 2018/0049079 A1* | 2/2018 | Ozturk | H04W 36/08 |
| 2018/0091986 A1* | 3/2018 | Pedersen | H04W 36/26 |
| 2018/0199251 A1* | 7/2018 | Kim | H04W 74/0833 |
| 2018/0279181 A1* | 9/2018 | Hampel | H04W 72/046 |
| 2018/0332507 A1* | 11/2018 | Fujishiro | H04J 11/00 |
| 2018/0338271 A1* | 11/2018 | Park | H04B 7/0695 |
| 2019/0297537 A1* | 9/2019 | Tsai | H04W 36/0016 |
| 2019/0297547 A1* | 9/2019 | Tsai | H04L 5/0048 |
| 2020/0022004 A1* | 1/2020 | Liu | H04W 24/04 |
| 2020/0029292 A1* | 1/2020 | Zou | H04W 56/001 |

OTHER PUBLICATIONS

3GPP TS 36.300 V15.3.0; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15), Sep. 2018, consisting of 358-pages.

3GPP TS 38.300 V15.3.0; 3rd Generation Partnership Project; Technical Specification Group Radio Access Network; NR; NR and NG-RAN Overall Description; Stage 2 (Release 15), Sep. 2018, consisting of 92-pages.

3GPP TSG-RAN WG2#107 Tdoc R2-1908969 (Revision of R2-1906228); Title: Beam aspects of RACH-less handover; Agenda Item: 11.9.2.4; Source: Ericsson; Document for: Discussion, Decision; Date and Location: Aug. 26-30, 2019, Prague, Czech Republic, consisting of 10-pages.

3GPP TSG-RAN WG2 RAN2#107bis Tdoc R2-1912681; Title: B2-step CFRA; Agenda Item: 6.13.6; Source: Ericsson; Document for: Discussion, Decision; Date and Location: Oct. 14-18, 2019, Chongqing, China, consisting of 12-pages.

3GPP TSG-RAN WG2 Meeting #105 R2-1900607; Title: RACH-less HO in beam-based system; Agenda Item: 11.9.3; Source: Nokia, Nokia Shanghai Bell; WID/SID: NR_Mob_enh-Core-Release 16; Document for: Discussion and Decision; Date and Location: Feb. 25-Mar. 1, 2019, Athens, Greece, consisting of 5-pages.

3GPP TSG-RAN WG2 #101 R2-1802542; Title: Support of RACH-less handover in NR; Agenda Item: 10.2.7; Source: LG Electronics; Document for: Discussion; Date and Location: Feb. 26-Mar. 2, 2018, Athens, Greece, consisting of 3-pages.

3GPP TSG RAN WG2 Meeting #98 R2-1704768; Title: RACH procedure during handover in NR; Agenda Item: 10.2.7; Source: Intel Corporation; Document for: Discussion and Decision; Date and Location: May 15-19, 2017, Hangzhou, China, consisting of 3-pages.

3GPP TSG-RAN WG2 #101 R2-1801786 Resubmission of R2-1712220; Title: Discussion on RACH-less Handover fo NR; Agenda Item: 10.2.7; Source: OPPO; Document for: Discussion and Decision; Date and Location: Feb. 26-Mar. 2, 2018, Athens, Greece, consisting of 5-pages.

* cited by examiner

BEAM LIMITATIONS FOR RACH-LESS ACCESS

CROSS-REFERENCE TO RELATED APPLICATIONS

This application is a Submission Under 35 U.S.C. § 371 for U.S. National Stage Patent Application of International Application No.: PCT/SE2019/051259, filed Dec. 10, 2019 entitled "BEAM LIMITATIONS FOR RACH-LESS ACCESS," which claims priority to U.S. Provisional Application No. 62/805,852, filed Feb. 14, 2019, entitled "BEAM LIMITATIONS FOR RACH-LESS ACCESS," the entireties of both of which are incorporated herein by reference.

RELATED APPLICATION

The present application claims the benefit of and priority to U.S. Provisional Patent Application No. 62/805,852, filed Feb. 20, 2019, entitled "BEAM LIMITATIONS FOR RACH-LESS ACCESS."

BACKGROUND

The present disclosure relates generally to communications, and more particularly, to wireless communications and related wireless devices and network nodes.

A simplified wireless communication system is illustrated in FIG. 1. The system includes a UE 100 that communicates with one or more access nodes 210, 220 using radio connections 107, 108. The access nodes 210, 220 are connected to a core network node 106. The access nodes 210-220 are part of a radio access network 105.

For wireless communication systems pursuant to 3GPP Evolved Packet System, EPS (also referred to as Long Term Evolution, LTE, or 4G) standard specifications, such as specified in 3GPP TS 36.300 and related specifications, the access nodes 220, 220 correspond typically to an Evolved NodeB (eNB) and the core network node 106 corresponds typically to either a Mobility Management Entity (MME) and/or a Serving Gateway (SGW). The eNB is part of the radio access network 105, which in this case is the E-UTRAN (Evolved Universal Terrestrial Radio Access Network), while the MME and SGW are both part of the EPC (Evolved Packet Core network).

For wireless communication systems pursuant to 3GPP 5G System, 5GS (also referred to as New Radio, NR, or 5G) standard specifications, such as specified in 3GPP TS 38.300 and related specifications, the access nodes 103-104 correspond typically to a 5G NodeB (gNB) and the network node 106 corresponds typically to either an Access and Mobility Management Function (AMF) and/or a User Plane Function (UPF). The gNB is part of the radio access network 100, which in this case is the NG-RAN (Next Generation Radio Access Network), while the AMF and UPF are both part of the 5G Core Network (5GC).

RACH-Less Handover/SCG Change

When a UE initially accesses an access node, either as part of a handover or a secondary cell group (SCG) change, the UE typically performs a random access procedure by which the UE transmits a random access message in the form of a RACH preamble transmission (MSG1) to the target node via a random access channel (RACH). The target node receives the RACH preamble transmission and responsively transmits configuration information to the UE in the form of a Random Access Response (MSG2) transmission that allows the UE to transmit uplink signals to the access node via resources allocated to the UE. In a contention-based RACH procedure, the UE does not have specific resources allocated on the RACH for transmission of the RACH preamble, while in a non-contention RACH procedure, the UE does have specific resources allocated on the RACH for transmission of the RACH preamble.

RACH-less handover (and RACH-less SCG change) have been specified for LTE, as part of 3GPP Release 14, to decrease the interruption time at handover and SCG change, respectively. A RACH-less handover procedure means that no MSG1 transmission, i.e. RACH preamble transmission by the UE, or MSG2 transmission, i.e. network responding with Random Access Response message, are performed when accessing the target cell during the handover.

Through a MSG2 transmission, the network provides the UE with an uplink (UL) grant for transmission of more information to the network, in a so called MSG3. The initial MSG1 is used by the network to determine a Timing Advance (TA) value that the UE should use in its uplink transmissions in order for them to reach the network at the right point in time, i.e. a point in time related to when the UE receives downlink transmissions from the cell. The TA value is mainly dependent on the distance from the UE and the base station/antenna, and the initial value to use is signaled to the UE in MSG2.

In a RACH-less handover/SCG change, the UE is instead provided with a TA value prior to accessing the target cell. In order for the MSG3 message to reach the target node at the right point in time, the correct TA value to use for the UE in the target cell thus needs to be known in advance. The use of RACH-less handover/SCG change is thus restricted to cases where the target cell is known to have the same TA value as another cell where the UE already has a connection and thus a known TA value (such as a PCell, PSCell or SCell) when the handover is initiated, or the target cell is known to have a TA value=0, i.e. it is a small cell.

In a RACH-less handover/SCG change, the UL grant for MSG3 transmission in the target cell can be provided to the UE in two different ways.

First, the UL grants can be pre-allocated to the UE in the handover (HO) Command message, i.e. within the RRCConnectionReconfiguration message instructing the UE to perform the handover or SCG change.

Second, the target cell can schedule the UE with UL grants (for PUSCH resources) using the PDCCH. The UE is then scheduled through the PDCCH using the C-RNTI that the UE has been configured with in the target cell.

In the alternative, to pre-allocate the UL grants, the target node may configure UL grants (to PUSCH resources) to the UE in advance, meaning that those resources cannot be allocated to any other UE. This may be problematic in high load scenarios or if several RACH-less handover/SCG changes are to be performed simultaneously.

The alternative to schedule the UE in the target cell via the PDCCH gives more flexibility for the target node in its resource allocation, but it requires an additional PDCCH resource in the target cell for each UL grant, and it imposes an additional delay compared to the pre-allocation alternative. The additional delay is due to the delay between the reception of the PDCCH scheduling in the target cell until the occurrence of the scheduled UL grant (i.e., the scheduled PUSCH resource).

The alternative to pre-allocate UL grants to the UE means that the UE can access the target cell at the first UL grant that is available (pre-allocated) for it when it is ready for transmission in the target cell, i.e. after e.g. downlink synchronization and tuning towards the target cell. The typical delay until the first available UL grant then depends on the frequency of the pre-allocated UL grants. Three different periodicities have been specified for the pre-allocated UL grants, either every 2nd, every 5th or every 10th subframe, where a subframe corresponds to 1 millisecond.

A RACH-less configuration is valid until successful completion of the handover or SCG change, or until expiry of timer T304 or T307, respectively. Timer T304 and T307 are started by the UE when it receives a RRCConnectionReconfiguration message instructing it to perform a handover or SCG change, respectively. This means that the UE that is configured with pre-allocated UL grants will consider itself to have received UL grants for that time. In case the UE receives a RACH-less configuration with the PDCCH scheduling alternative, it will instead monitor the PDCCH for UL grant scheduling during the same time period.

RACH-less HO/SCG change has not been standardized for NR, but this can be expected to be done in coming releases of the standard and it can be expected to use the corresponding LTE mechanism as the baseline.

Beam Selection in NR

The random access procedure in NR is similar to that used in LTE. In particular, the message sequence is the same, and it also comes in a contention based and contention free variant. The major difference is that the random access procedure in NR is also used for beam selection. Referring to FIG. 2, a communication system that utilizes beamforming is illustrated. In particular, a radio access node 200 may form antenna beams 215 using analog or digital beamforming techniques that provide spatial separation of signals transmitted/received by the radio access node 200. When a UE 100 performs a handover or SCG modification from a source node 210 to a target cell 212 in the radio access node 200, the UE 100 performs beam selection to select a downlink (DL) beam for communicating with the target cell 212.

When a handover or SCG change is performed in NR, the UE 100 will synchronize to the target cell and determine the best DL beam to use. The UE 100 will then transmit the RACH preamble on the RACH opportunity corresponding to the selected beam, thus informing the target cell 212 of the DL beam the UE has selected.

Determining the DL beam in the manner described above using different RACH opportunities is only necessary if the target cell 212 is using analog beamforming, which means it can only listen in one direction (beam) at the time. If the target cell 212 is capable of digital Rx beamforming however, the RACH occasion can be common for all DL beams and the target cell 212 can instead determine the best DL beam using beam sweeping in the digital domain. Here beam correspondence is assumed, which means that the target cell 212 can determine its DL Tx (UL Rx) beam from its UL Rx (DL Tx) beam.

SUMMARY

Some embodiments provide a method by a user equipment, UE, in a wireless communication system including receiving an access command from a source node, the access command instructing the UE to access a target cell and including an access configuration specifying an access method without random access and one or more valid target cell beams for which the access configuration is valid at the target cell, and accessing the target cell in response to the access command.

The access configuration may specify one or more pre-allocated uplink transmission resource grant(s). In some embodiments, the access configuration may indicate that the UE should receive an uplink transmission resource grant in a downlink transmission in the target cell, wherein the downlink transmission is associated with one of the one or more valid target cell beams in the target cell.

The method may further include performing beam selection at the target cell to select a target cell beam for communicating with the target cell, and determining if the selected target cell beam corresponds to at least one of the one or more valid target cell beams.

A user equipment, UE, according to some embodiments includes a processor circuit, a transceiver coupled to the processor circuit, and a memory coupled to the processor circuit. The memory includes machine readable program instructions that, when executed by the processor circuit, cause the UE to perform operations of receiving an access command from a source node, the access command instructing the UE to access a target cell and including an access configuration specifying an access method without random access and one or more valid target cell beams for which the access configuration is valid at the target cell, and accessing the target cell in response to the access command.

A user equipment according to some embodiments is operative to receive an access command from a source node, the access command instructing the UE to access a target cell and including an access configuration specifying an access method without random access and one or more valid target cell beams for which the access configuration is valid at the target cell, and access the target cell in response to the access command.

Some embodiments provide a method by a node in a wireless communication system that includes preparing an access command for instructing a user equipment, UE, to access a target cell, the access command including an access configuration specifying an access method without random access and one or more valid target cell beams for which the access configuration is valid at the target cell, and transmitting the access command toward the UE.

A network node according to some embodiments includes a processor circuit, a transceiver coupled to the processor circuit, and a memory coupled to the processor circuit. The memory includes machine readable program instructions that, when executed by the processor circuit, cause the UE to perform operations comprising operations of preparing an access command for instructing a user equipment, UE, to access a target cell, the access command including an access configuration specifying an access method without random access and one or more valid target cell beams for which the access configuration is valid at the target cell, and transmitting the access command toward the UE.

A network node according to some embodiments is operative to prepare an access command for instructing a user equipment, UE, to access a target cell, the access command including an access configuration specifying an access method without random access and one or more valid target cell beams for which the access configuration is valid at the target cell, and transmit the access command toward the UE.

Some embodiments described herein may avoid additional delays and/or additional PDCCH or MSG3 transmissions in cases where a UE has moved into a different target cell beam just before or during a handover procedure.

BRIEF DESCRIPTION OF THE DRAWINGS

The accompanying drawings, which are included to provide a further understanding of the disclosure and are incorporated in a constitute a part of this application, illustrate certain non-limiting embodiments of inventive concepts. In the drawings.

DETAILED DESCRIPTION

Figure 1:
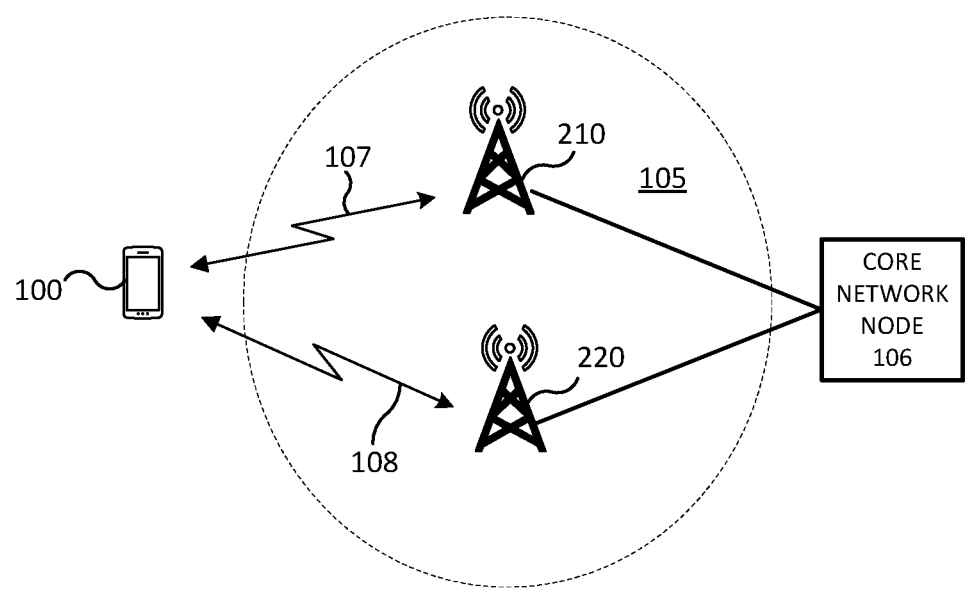
FIG. 1 illustrates a wireless communication system.
Figure 2:
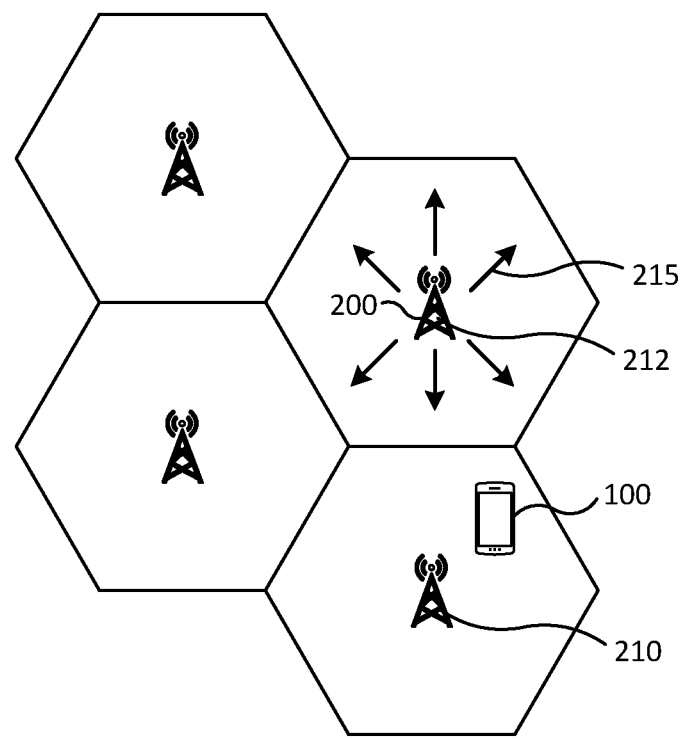
FIG. 2 illustrates handover in a wireless communication system that uses beamforming.

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

In a RACH-less handover/SCG change in NR, the target gNB will not be able to detect what beam the UE has selected based on the RACH preamble transmission, since the RACH preamble transmission is not performed in that case.

When the RACH-less HO/SCG change is configured to provide UL grants to the UE in the target cell (for MSG3 transmission) through PDCCH scheduling in the target cell, the gNB may then need to transmit the PDCCH in several different directions (beams) in order to reach the UE. This is the case if the target gNB does not know the position of the UE and thus in what direction (e.g. using what beam) transmissions should be performed in order to reach the UE. The measurements that triggered the handover may contain DL measurements on beam level, but there is a risk that the UE will have moved into another beam before the point in time at which the UE accesses the target cell at the handover. The target gNB may therefore need to transmit the PDCCH in several different directions (beams) to reach the location where the UE is located. This may cause additional delays to reach the UE and cause resource utilization to perform such multiple PDCCH transmissions, especially since the target gNB would need to perform the transmission in all possible directions (beams) in order to reach the UE as quickly as possible.

Similarly, if the RACH-less HO/SCG change is configured with pre-allocated UL grants to the UE in the target cell (for MSG3 transmission), the gNB will need to receive the MSG3 transmission from the position where the UE is located. If the target gNB only supports analog RX beamforming, i.e. that it can only receive transmissions from a specific direction (beam) at a time, it will need to attempt to receive the MSG3 transmission from one specific direction at a time in each UL grant. If the UE has moved between the beams, the target gNB may need to try several different directions/beams until it detects a MSG3 transmission from the UE. This can lead to the situation that the UE may need to transmit MSG3 in several subsequent UL grants until the target gNB uses a receiver beamforming in the direction where the UE is currently located. This may also cause an additional delay at the handover procedure.

According to some embodiments described herein, when a RACH-less handover or a RACH-less SCG change is configured for an NR target cell, the RACH-less configuration is restricted to a single beam or a few beams at the target gNB. In the event the UE selects (or otherwise ends up in) another beam in the target cell, the UE performs a RACH procedure instead. The RACH procedure can then be performed as a Contention Free Random Access procedure if dedicated RACH resources are configured for the beam where the UE then is located, or otherwise as a Contention Based Random Access procedure.

According to some embodiments, it may be possible to configure a RACH-less handover or RACH-less SCG change to an NR cell where beamforming is used, where UL grants in the target cell are provided through PDCCH scheduling, while still providing that the PDCCH transmissions only need to be performed in a single or a few directions (beams). If the UE is no longer present in that (any of those) direction(s), it will then perform a RACH procedure, whereby the target gNB will be informed that the UE has moved and in what direction.

It is also possible to configure a RACH-less handover or RACH-less SCG change to an NR cell where analog RX beamforming is used, where UL grants in the target cell are pre-allocated to the UE in the HO Command (RRCReconfiguration) message, while still providing that gNB only needs to direct its receiver beam in a single direction (beam) or a few directions (beams) in the pre-allocated UL grants. If the UE is no longer present in that (any of those) direction(s), it will then perform a RACH procedure, whereby the target gNB will be informed that the UE has moved and in what direction.

The embodiments described herein may avoid additional delays and/or additional PDCCH or MSG3 transmissions in cases where the UE has moved into a different target cell beam just before or during the handover procedure.

In some embodiments, a UE that is configured to perform a RACH-less handover or a RACH-less SCG change to a target NR cell is provided an indication of the DL beam(s) for which the RACH-less configuration is valid. If the RACH-less configuration (for the HO or SCG change) concerns PDCCH scheduling of UL grants in the target cell, the UE then only monitors for such PDCCH scheduling in the target cell (for reception of UL grant for MSG3 transmission), if the UE has selected any of the DL beams where the RACH-less configuration is configured to be valid.

In other embodiments, if the RACH-less configuration (for the HO or SCG change) includes pre-allocated UL grants for MSG3 transmission in the target cell, the UE then only performs transmission in such pre-allocated UL grants if it has selected any of the DL beams where the RACH-less configuration is configured to be valid.

The criteria for the UE to consider a DL beam as selected for the purpose of validity of the RACH-less configuration may be the same as the criteria for selection of a DL beam when the UE initiates a random access procedure. As an alternative, the UE may be configured with a different criteria for DL beam selection for the purpose of determining the validity of the RACH-less configuration.

In other embodiments, if the UE selects a DL beam (in the target cell) for which the RACH-less configuration is not configured to be valid, the UE performs a RACH procedure in order to access the target cell there. The UE then uses a Contention Based Random Access procedure when it accesses the cell.

Alternatively, the UE may be configured with dedicated RACH resources for one, several or all the other DL beams in the target cell in the HO command (RRCReconfiguration) message. If the UE selects a DL beam for which the RACH-less configuration is not configured as valid but for which there are dedicated RACH resources configured, the UE may then perform a Contention Free Random Access procedure using those dedicated RACH resources.

Figure 3:
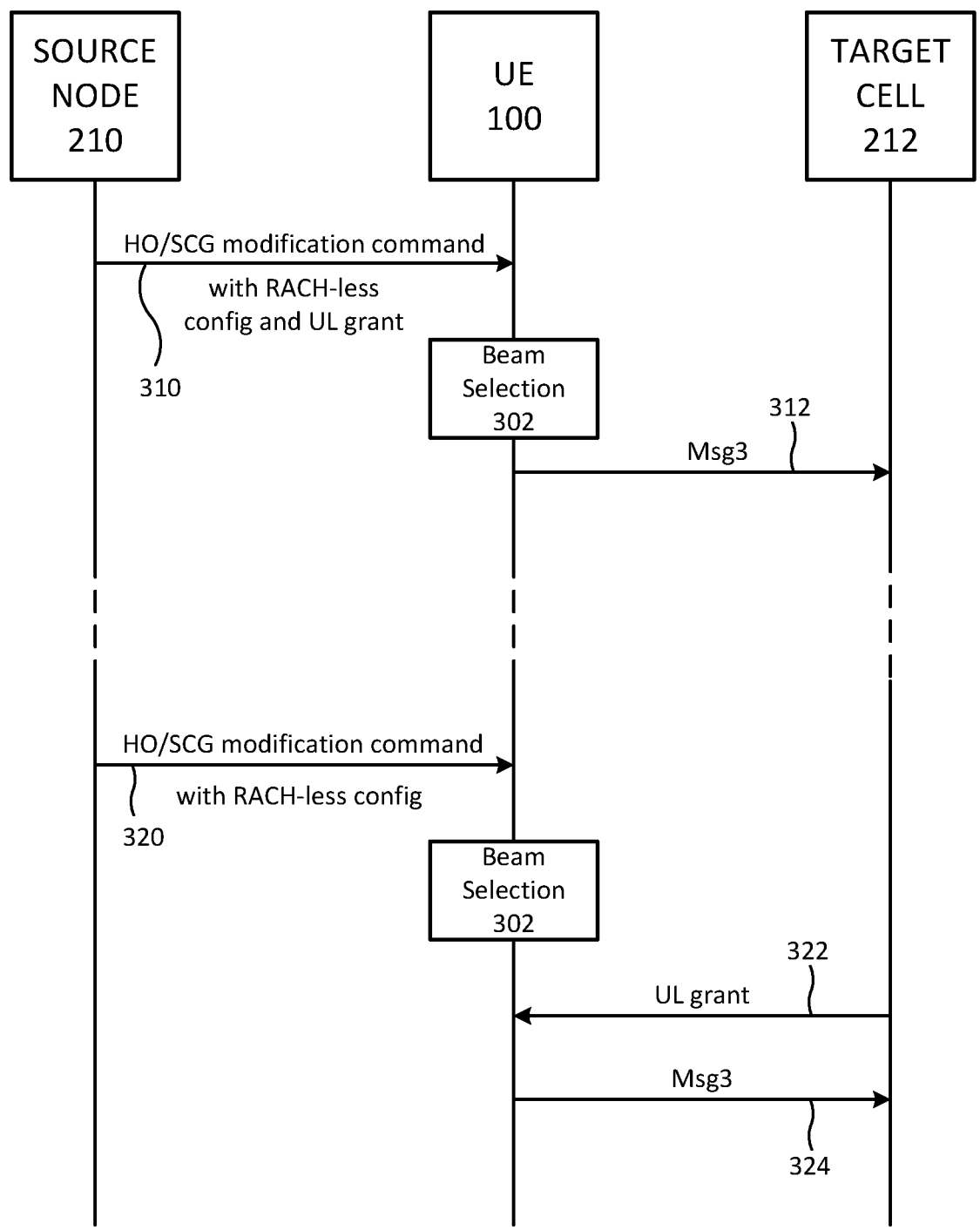
FIGS. 3 and 4 are flow diagrams illustrating messages exchanged in a wireless communication system according to some embodiments.
Figure 4:
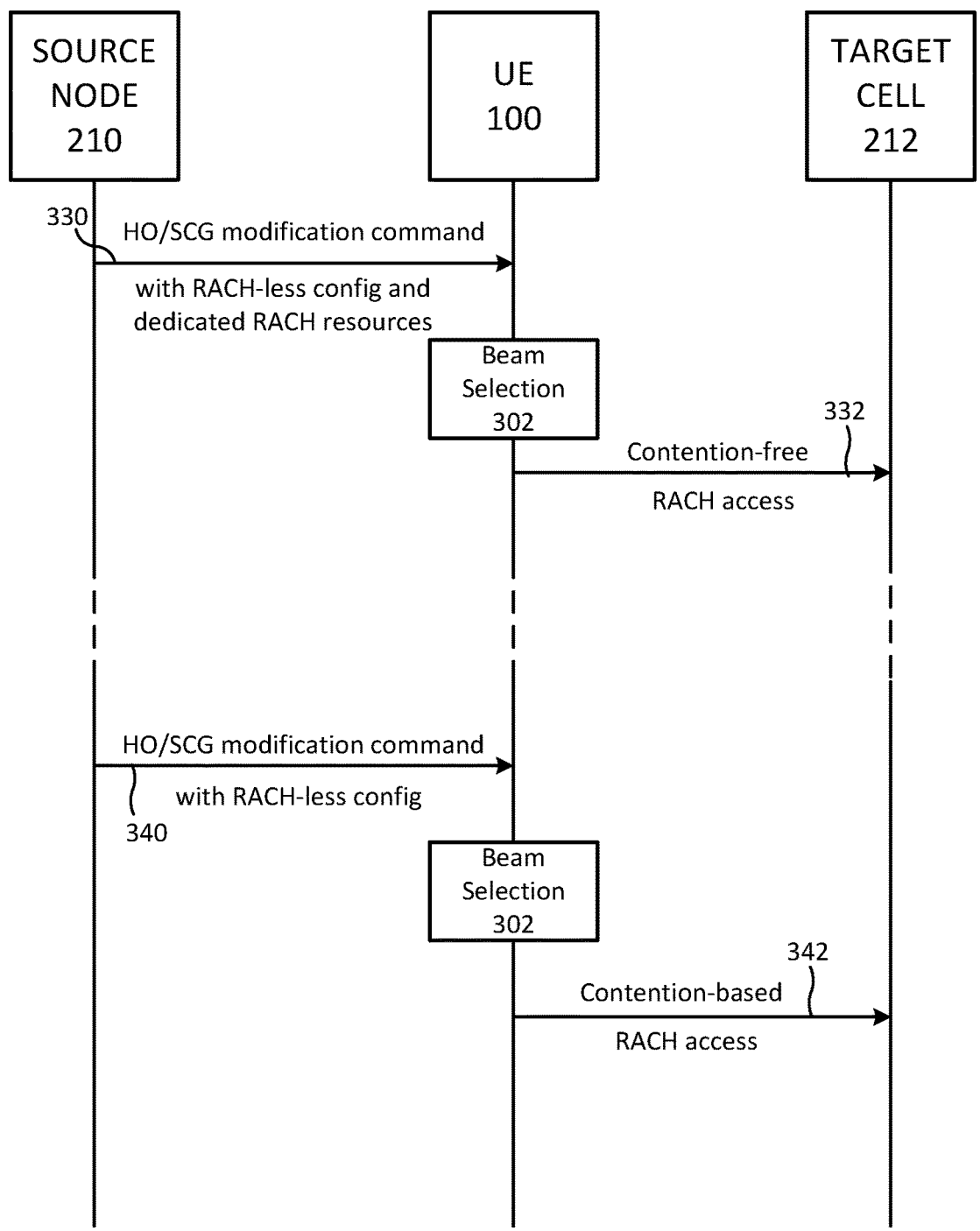

Various scenarios are illustrated in the flow diagrams of FIGS. 3 and 4. For example, referring to FIG. 3, in one scenario, a source node 210 (which may be a gNB) transmits an access command 310 in the form of a handover (HO) or SCG modification command to a UE 100 served by the source node instructing the UE 100 to access a target cell 212. It will be appreciated that the target cell 212 may be a different cell provided by the source node 210. Thus, the source node 210 and the target node 220 may be the same physical node. The access command 310 includes an access configuration including an identification of one or more beams of the target cell 212 that are configured for access by the UE 100 without the use of random access procedures. The identification of which target beams at the target cell 212 are configured for non-RACH access may be coordinated using back-haul communications between the source node 210 and the target node 220.

The access command 310 also includes an uplink (UL) grant on the PUSCH that can be used by the UE 100 to transmit a MSG3 message to the target node 220 as part of the non-RACH procedure. In response to the access command 310, the UE 100 performs a beam selection procedure 302 to identify a beam to use for communications with the target cell 212. Once the UE 100 selects a beam, the UE 100 determines if the selected beam is configured for non-RACH access based on the access configuration included in the access command 310. If the selected beam is configured for non-RACH access (i.e., the selected beam corresponds to the one or more beams of the target cell 212 identified in the access command 310 that are configured for non-RACH access by the UE 100), the UE 100 transmits a MSG3 message 312 to the target cell 212 using the allocated UL resources.

In another scenario illustrated in FIG. 3, the source node 210 transmits an access command 320 in the form of a handover (HO) or SCG modification command to the UE 100 to access the target cell 212. The access command 320 includes an access configuration including an identification of one or more beams of the target cell 212 that are configured for non-RACH access by the UE 100, but does not include an uplink grant. In response to the access command 320, the UE 100 performs a beam selection procedure 302 to identify a beam to use for communications with the target cell 212. Once the UE 100 selects a beam, the UE 100 determines if the selected beam is configured for non-RACH access based on the access configuration included in the access command 320. If the selected beam is configured for non-RACH access (i.e., the selected beam corresponds to the one or more beams of the target cell 212 identified in the access command 320 that are configured for non-RACH access by the UE 100), the UE 100 uses the selected beam to receive an uplink grant 322 (e.g., of PUSCH resources) from the target cell 212. The UE 100 then transmits a MSG3 message 324 using the granted resources.

In a further scenario illustrated in FIG. 4, the source node 210 transmits an access command 330 in the form of a handover (HO) or SCG modification command to the UE 100 to access the target cell 212. The access command 330 includes an access configuration including an identification of one or more beams of the target cell 212 that are configured for non-RACH access by the UE 100, and also includes an identification of dedicated RACH resources that can be used by the UE 100 in case a RACH procedure is needed. In response to the access command 330, the UE 100 performs a beam selection procedure 302 to identify a beam to use for communications with the target cell 212. Once the UE 100 selects a beam, the UE 100 determines if the selected beam is configured for non-RACH access based on the access configuration included in the access command 330. If the selected beam is not configured for non-RACH access (i.e., the selected beam does not correspond to the one or more beams of the target cell 212 identified in the access command 330 that are configured for non-RACH access by the UE 100), the UE 100 performs a contention-free RACH access procedure 332 to access the target cell 212.

Referring still to FIG. 4, in a further scenario, the source node 210 transmits an access command 340 in the form of a handover (HO) or SCG modification command to the UE 100 to access the target cell 212. The access command 340 includes an access configuration including an identification of one or more beams of the target cell 212 that are configured for non-RACH access by the UE 100, but does not include an identification of dedicated RACH resources that can be used by the UE 100 in case a RACH procedure is needed. In response to the access command 340, the UE 100 performs a beam selection procedure 302 to identify a beam to use for communications with the target cell 212. Once the UE 100 selects a beam, the UE 100 determines if the selected beam is configured for non-RACH access based on the access configuration included in the access command 340. If the selected beam is not configured for non-RACH access (i.e., the selected beam does not correspond to the one or more beams of the target cell 212 identified in the access command 340 that are configured for non-RACH access by the UE 100), the UE 100 performs a contention-based RACH access procedure 342 to access the target cell 212.

Figure 5:
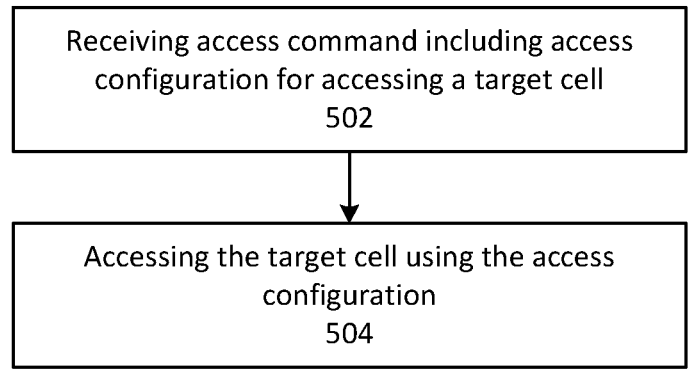
FIGS. 5, 6, 7 and 8 are flow charts illustrating operations of an LLS-CU according to some embodiments.

Operations of a UE 100 according to some embodiments are illustrated in the flowchart of FIG. 5. Referring to FIG. 5, a method by a UE 100 in a wireless communication system includes receiving (502) an access command from a source node. The access command instructs the UE to access a target cell and includes an access configuration specifying an access method without random access, i.e., a non-RACH based access (or RACH-less), or an access method in which the UE transmits on the PUSCH without having previously received a Random Access Response message, or Msg2, from the target cell, and one or more valid target cell beams for which the access configuration is valid at the target cell. The UE then accesses (504) the target cell in response to the access command.

The access configuration may specify one or more pre-allocated uplink transmission resource grant(s). In some embodiments, the access configuration may indicate that the UE should receive an uplink transmission resource grant in a downlink transmission in the target cell, wherein the downlink transmission is associated with one of the one or more valid target cell beams in the target cell.

Figure 6:
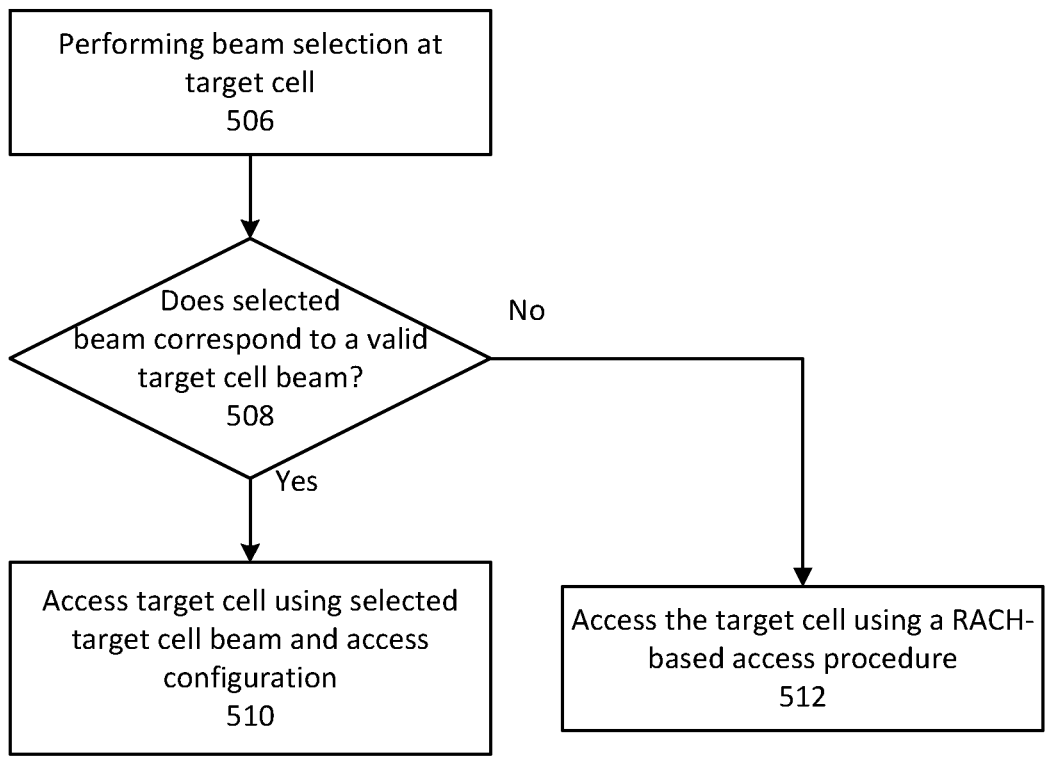

Referring to FIG. 6, the method may further include performing (506) beam selection at the target cell to select a target node beam for communicating with the target cell, and determining (508) if the selected target node beam corresponds to at least one of the one or more valid target node beams.

The method may further include, in response to determining that the selected target node beam corresponds to at least one of the one or more valid target node beams, performing (510) a non-RACH based access to the target cell using the selected target node beam.

The method may further include, in response to determining that the selected target node beam does not correspond to at least one of the one or more valid target node beams, accessing (512) to the target cell using a RACH-based access procedure.

The RACH-based access procedure may include a contention-based random access or a contention-free random access.

Figure 7:
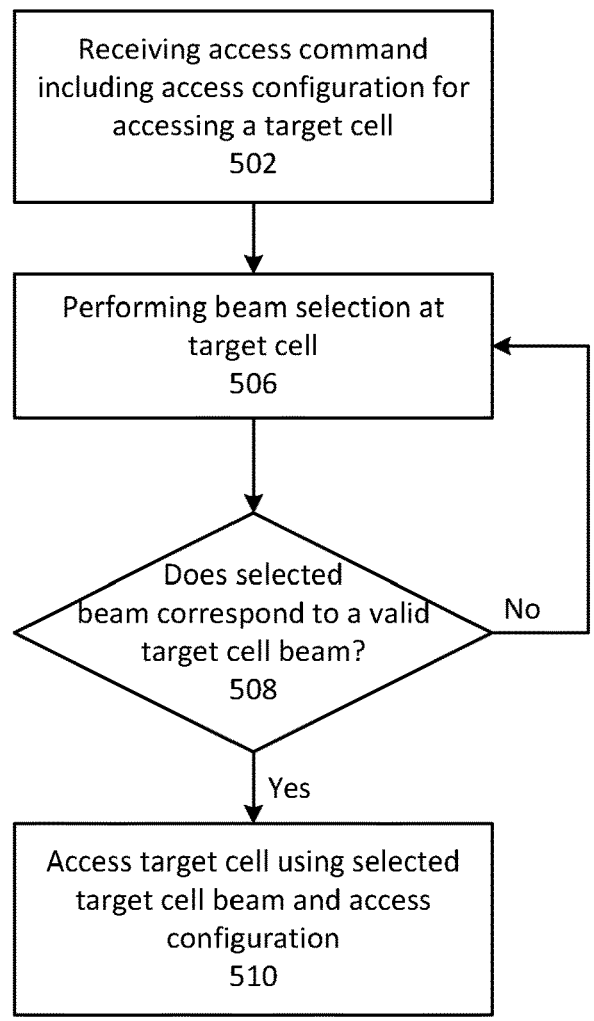

Referring to FIG. 7, the method may include, receiving (502) an access command from a source node, the access command instructing the UE to access a target cell and including an access configuration specifying one or more valid target node beams for which non-random access channel, RACH, based access is configured at the target cell. The method further includes performing (506) beam selection at the target cell to select a target node beam for communicating with the target cell, and determining (508) if the selected target node beam corresponds to at least one of the one or more valid target node beams.

In response to determining that the selected target node beam does not correspond to at least one of the one or more valid target node beams, the method repeats beam selection until a beam is selected that corresponds to at least one of the one or more valid target node beams. Once a beam is selected that is configured for non-RACH access, the UE 100 performs (510) a non-RACH based access to the target cell using the selected target node beam.

The access command may include a resource grant for performing the non-RACH based access to the target cell, and performing the non-RACH based access to the target cell using the selected target node beam may include transmitting an access message to the target node using the resource allocation grant included in the access command.

The access message may be transmitted via a physical uplink shared channel, PUSCH, and may include a MSG3 message.

Performing the non-RACH based access to the target cell using the selected target node beam may include receiving an uplink resource grant from the target cell, and transmitting an access message to the target cell using the uplink resource grant.

Receiving the uplink resource grant may include receiving an uplink grant via a physical downlink control channel, PDCCH, for resources on a physical uplink shared channel, PUSCH.

The access command may include a radio resource control, RRC, message, such as an RRCConnectionReconfiguration or RRCReconfiguration message.

Accessing the target cell using the access configuration may include attempting to perform a non-RACH based access to the target node using one of the one or more valid target node beams, and in response to failure of the attempt perform the non-RACH based access to the target cell using one of the one or more valid target node beams, performing a RACH-based access to the target cell.

The access command may include a handover command, and accessing the target node may include performing a handover to the target cell.

The access command may include a secondary cell group, SCG, modification command, and accessing the target cell may include performing an SCG modification at the target node.

Figure 8:
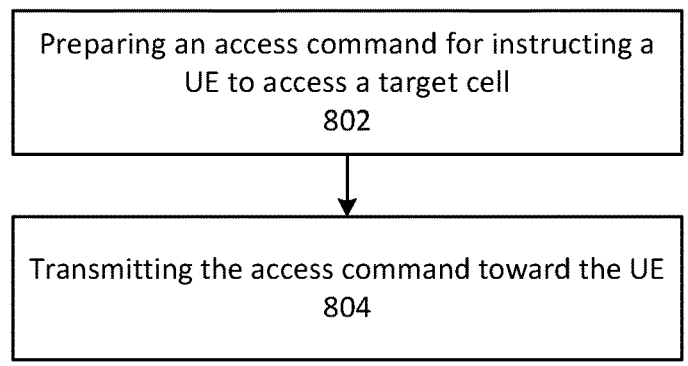

Referring to FIG. 8, a method by a source node in a wireless communication system according to some embodiments includes preparing (802) an access command for instructing a user equipment, UE, to access a target cell. The access command includes an access configuration specifying an access method without random access and one or more valid target cell beams for which the access configuration is configured at the target cell. The source node transmits (804) the access command toward the UE.

The access configuration may specify one or more pre-allocated uplink transmission resource grant(s). In some embodiments, the access configuration may indicate that the UE should receive an uplink transmission resource grant in a downlink transmission in the target cell, wherein the downlink transmission is associated with one of the one or more valid target cell beams in the target cell.

The method may further include inserting into the access command a resource grant for performing the non-RACH based access to the target cell.

The method may further include informing the target cell of the transmission of the access command to the UE.

The access command may include a radio resource control, RRC, message, such as an RRCConnectionReconfiguration or RRCReconfiguration message.

The access command may include a handover command or a secondary cell group, SCG, modification command.

Various embodiments provide a UE 100 that includes a processor circuit, a transceiver coupled to the processor circuit, and a memory coupled to the processor circuit. The memory includes machine-readable computer program instructions that, when executed by the processor circuit, cause the processor circuit to perform some of the operations depicted in FIGS. 5-7.

Figure 9A:
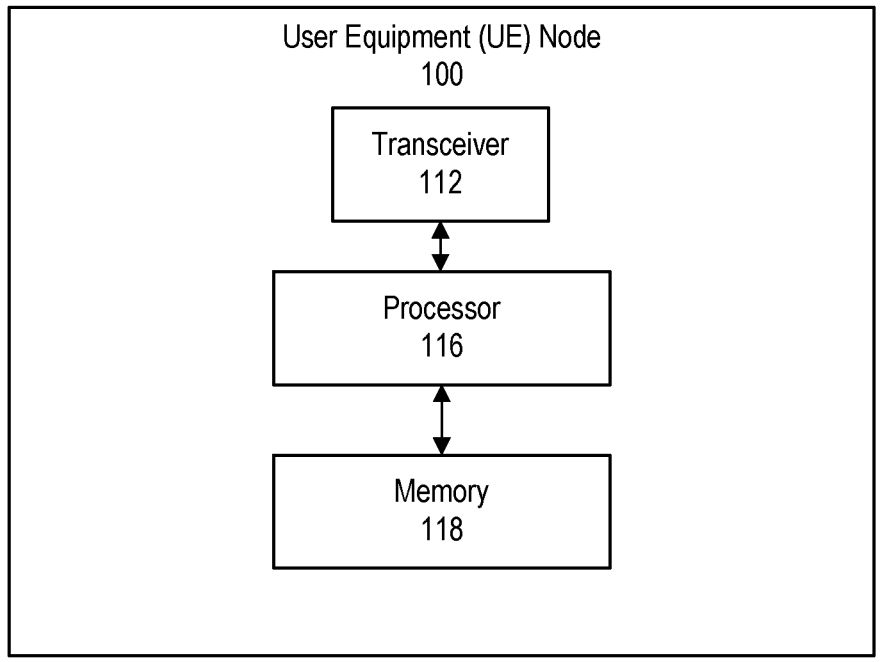
FIGS. 9A and 9B are block diagrams illustrating an example of a user equipment (UE) node according to some embodiments.

FIG. 9A depicts an example of a UE 100 of a wireless communication network configured to provide wireless communication according to embodiments of inventive concepts. As shown, the UE 100 may include a transceiver circuit 112 (also referred to as a transceiver) including a transmitter and a receiver configured to provide uplink and downlink radio communications with wireless devices. The UE 100 may also include a processor circuit 116 (also referred to as a processor) coupled to the transceiver circuit 112, and a memory circuit 118 (also referred to as memory) coupled to the processor circuit 116. The memory circuit 118 may include computer readable program code that when executed by the processor circuit 116 causes the processor circuit to perform operations according to embodiments disclosed herein. According to other embodiments, processor circuit 116 may be defined to include memory so that a separate memory circuit is not required.

As discussed herein, operations of the UE 100 may be performed by processor 116 and/or transceiver 112. For example, the processor 116 may control transceiver 112 to transmit uplink communications through transceiver 112 over a radio interface to one or more network nodes and/or to receive downlink communications through transceiver 112 from one or more network nodes over a radio interface. Moreover, modules may be stored in memory 118, and these modules may provide instructions so that when instructions of a module are executed by processor 116, processor 116 performs respective operations (e.g., operations discussed above with respect to example embodiments).

Accordingly, a UE 100 according to some embodiments includes a processor circuit 116, a transceiver 112 coupled to the processor circuit, and a memory 118 coupled to the processor circuit, the memory including machine readable program instructions that, when executed by the processor circuit, cause the UE to perform operations including receiving an access command from a source node, the access command instructing the UE to access a target node and including an access configuration specifying one or more valid target node beams for which non-random access channel, RACH, based access is configured at the target node, and accessing the target node using the access configuration.

Figures 10, 11:
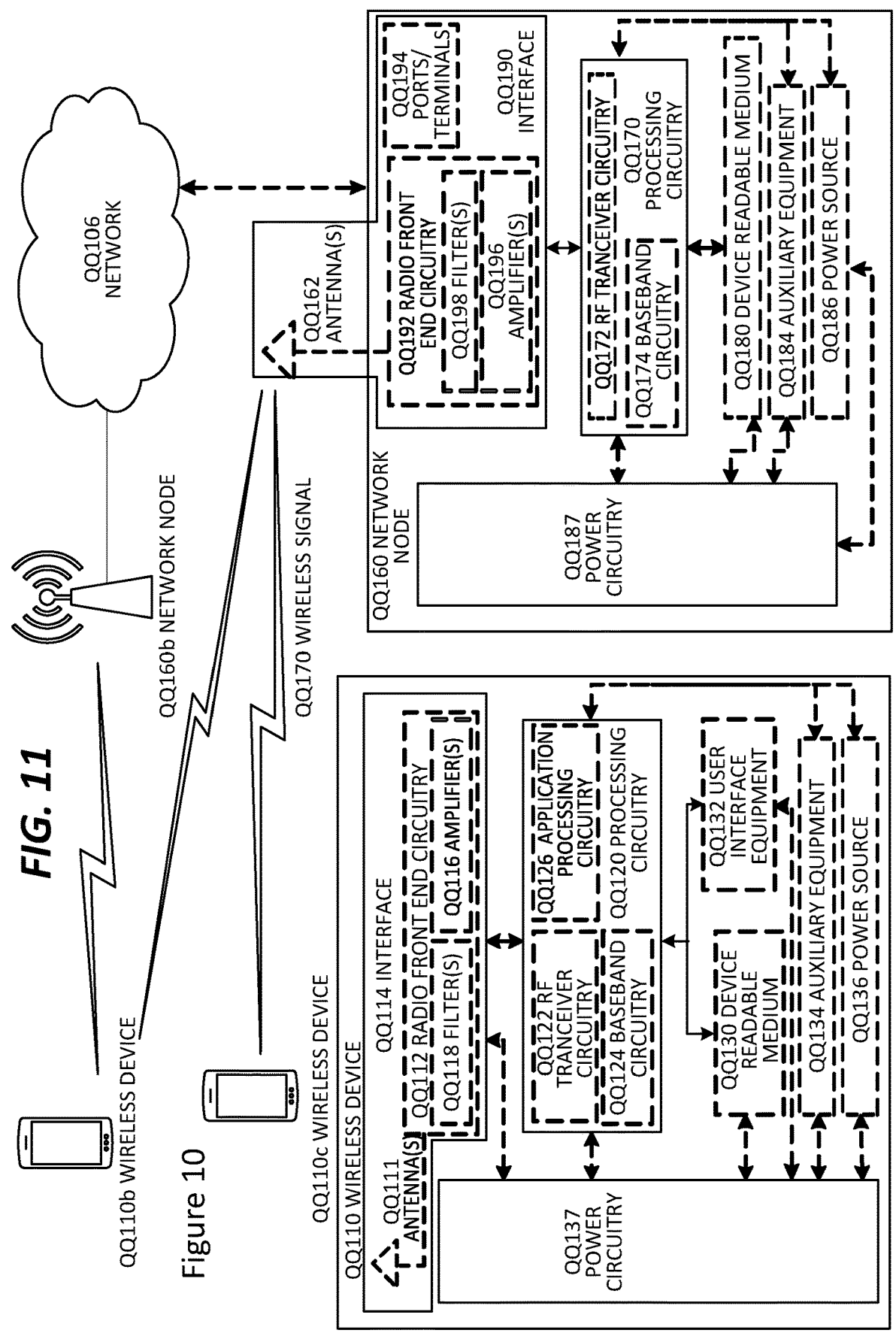
FIG. 11 is a block diagram of a wireless network in accordance with some embodiments.

An example of a UE 100 is shown in FIG. 11 as wireless device QQ110, as described in more detail below.

Figure 9B:
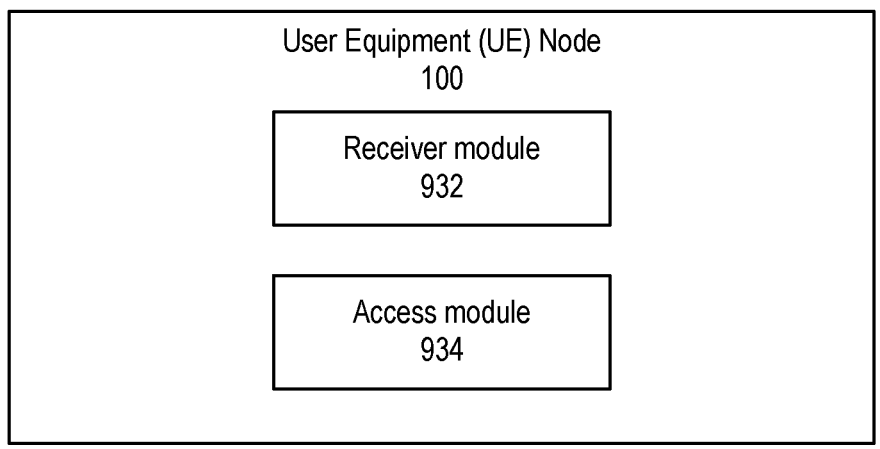

Referring to FIG. 9B, a UE 100 according to some embodiments includes a receiver module 932 for receiving an access command from a source node, the access command instructing the UE to access a target node and including an access configuration specifying one or more valid target node beams for which non-random access channel, RACH, based access is configured at the target node, and an access module 934 for accessing the target node using the access configuration.

Figure 10A:
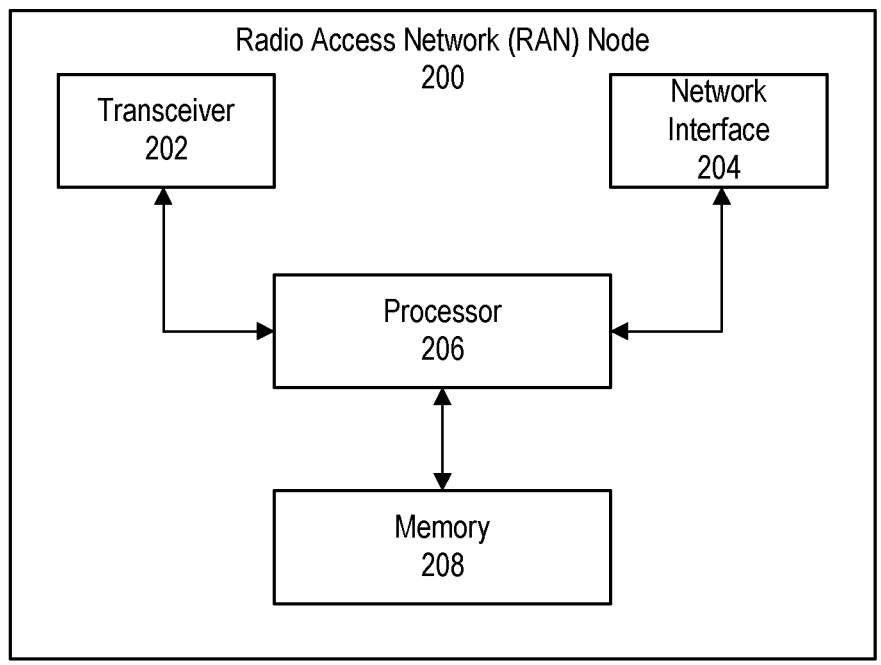
FIGS. 10A and 10B are block diagrams illustrating an example of a radio access network (RAN) node according to some embodiments.

FIG. 10A is a block diagram of a network node according to some embodiments. Various embodiments provide a radio access network node (RAN node, network node or RAN network node) that includes a processor circuit 206 a transceiver 202 coupled to the processor circuit, and a memory 208 coupled to the processor circuit. The memory 208 includes machine-readable computer program instructions that, when executed by the processor circuit, cause the processor circuit to perform some of the operations depicted in FIG. 8.

FIG. 10A depicts an example of a network node 200 (also referred to as a base station, eNB, eNodeB, gNB, gNodeB, etc.) of a wireless communication network configured to provide cellular communication according to embodiments of inventive concepts. The network node 200 may correspond to a central unit, a radio unit or a combination of a central unit and a radio unit in a RAN node. As shown, network node 200 may include a transceiver circuit 202 (also referred to as a transceiver) including a transmitter and a receiver configured to provide uplink and downlink radio communications with wireless devices. The network node 200 may include a network interface circuit 204 (also referred to as a network interface) configured to provide communications with other nodes (e.g., with other base stations and/or core network nodes) of the wireless communication network. The network node 200 may also include a processor circuit 206 (also referred to as a processor) coupled to the transceiver circuit 202, and a memory circuit 208 (also referred to as memory) coupled to the processor circuit 206. The memory circuit 208 may include computer readable program code that when executed by the processor circuit 206 causes the processor circuit to perform operations according to embodiments disclosed herein. According to other embodiments, processor circuit 206 may be defined to include memory so that a separate memory circuit is not required.

As discussed herein, operations of the network node 200 may be performed by processor 206, network interface 204, and/or transceiver 202. For example, processor 206 may control transceiver 202 to transmit downlink communications through transceiver 202 over a radio interface to one or more UEs and/or to receive uplink communications through transceiver 202 from one or more UEs over a radio interface. Similarly, processor 206 may control network interface 204 to transmit communications through network interface 204 to one or more other network nodes and/or to receive communications through network interface from one or more other network nodes. Moreover, modules may be stored in memory 208, and these modules may provide instructions so that when instructions of a module are executed by processor 206, processor 206 performs respective operations (e.g., operations discussed below with respect to example embodiments). In addition, a structure similar to that of FIG. 10A may be used to implement other network nodes, for example, omitting transceiver 202. Moreover, network nodes discussed herein may be implemented as virtual network nodes.

Accordingly, a network node 200 (or radio access network (RAN) node 200) according to some embodiments includes a processor circuit 206, a transceiver 202 coupled to the processor circuit, and a memory 208 coupled to the processor circuit, the memory including machine readable program instructions that, when executed by the processor circuit, cause the UE to perform operations including preparing an access command for instructing a user equipment, UE, that is connected to the source node to access a target node, the access command including an access configuration specifying one or more valid target node beams for which non-random access channel, RACH, based access is configured at the target node, and transmitting the access command to the UE.

An example of a network node 200 is shown in FIG. 11 as network node QQ160, as described in more detail below.

Figure 10B:
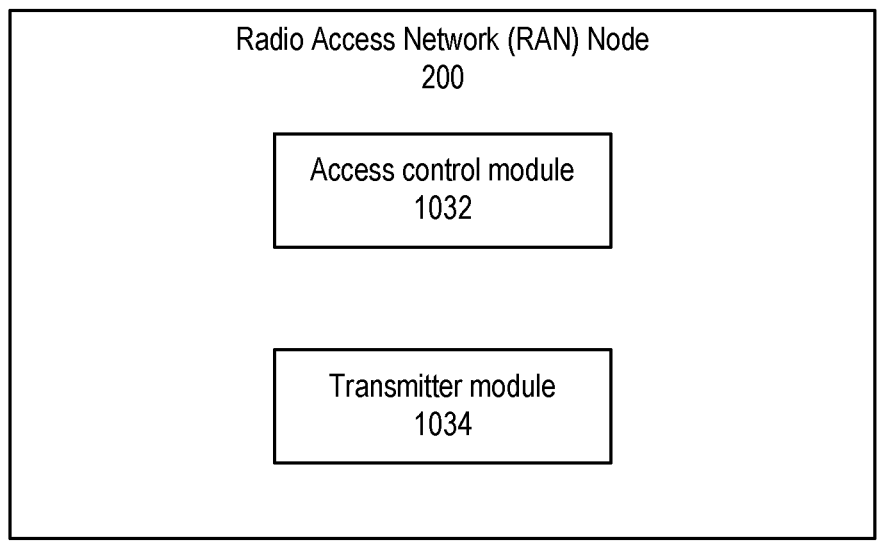

Referring to FIG. 10B, a network node 200 according to some embodiments includes an access control module 1032 for preparing an access command for instructing a user equipment, UE, that is connected to the source node to access a target node, the access command including an access configuration specifying one or more valid target node beams for which non-random access channel, RACH, based access is configured at the target node, and a transmitter module 1034 for transmitting the access command to the UE.

Listing of Example Embodiments

Example Embodiments are discussed below. Reference numbers/letters are provided in parenthesis by way of example/illustration without limiting example embodiments to particular elements indicated by reference numbers/letters.

Embodiment 1. A method by a user equipment, UE, in a wireless communication system, comprising:
 receiving an access command from a source node, the access command instructing the UE to access a target node and including an access configuration specifying one or more valid target node beams for which non-random access channel, RACH, based access is configured at the target node; and
 accessing the target node using the access configuration.

Embodiment 2. The method of Embodiment 1, further comprising:
 performing beam selection at the target node to select a target node beam for communicating with the target node; and
 determining if the selected target node beam corresponds to at least one of the one or more valid target node beams.

Embodiment 3. The method of Embodiment 2, further comprising:
 in response to determining that the selected target node beam corresponds to at least one of the one or more valid target node beams, performing a non-RACH based access to the target node using the selected target node beam.

Embodiment 4. The method of Embodiment 2, further comprising:
 in response to determining that the selected target node beam does not correspond to at least one of the one or more valid target node beams, accessing to the target node using a RACH-based access procedure.

Embodiment 5. The method of Embodiment 4, wherein the RACH-based access procedure comprises a contention-based random access.

Embodiment 6. The method of Embodiment 4, wherein the RACH-based access procedure comprises a contention-free random access.

Embodiment 7. The method of Embodiment 2, further comprising:
 in response to determining that the selected target node beam does not correspond to at least one of the one or more valid target node beams, repeating beam selection until a beam is selected that corresponds to at least one of the one or more valid target node beams.

Embodiment 8. The method of Embodiment 3, wherein the access command includes a resource grant for performing the non-RACH based access to the target node, and wherein performing the non-RACH based access to the target node using the selected target node beam comprises transmitting an access message to the target node using the resource grant included in the access command.

Embodiment 9. The method of Embodiment 8, wherein transmitting the access message comprises transmitting the access message via a physical uplink shared channel, PUSCH.

Embodiment 11. The method of Embodiment 3, wherein performing the non-RACH based access to the target node using the selected target node beam comprises:
 receiving an uplink resource grant from the target access node; and
 transmitting an access message to the target node using the uplink resource grant.

Embodiment 12. The method of Embodiment 11, wherein receiving the uplink resource grant comprises receiving the uplink resource grant via a physical downlink control channel, PDCCH, for resources on a physical uplink shared channel, PUSCH.

Embodiment 13. The method of any previous Embodiment, wherein the access command comprises a radio resource control, RRC, message.

Embodiment 14. The method of any previous Embodiment, wherein the access command comprises an RRCConnectionReconfiguration message.

Embodiment 15. The method of Embodiment 1, wherein accessing the target node using the access configuration comprises:
 attempting to perform a non-RACH based access to the target node using one of the one or more valid target node beams; and
 in response to failure of the attempt perform the non-RACH based access to the target node using one of the one or more valid target node beams, performing a RACH-based access to the target node.

Embodiment 16. The method of any previous Embodiment, wherein the access command comprises a handover command, and wherein accessing the target node comprises performing a handover to the target node.

Embodiment 17. The method of any of Embodiments 1 to 15, wherein the access command comprises a secondary cell group, SCG, modification command, and wherein accessing the target node comprises performing an SCG modification at the target node.

Embodiment 18. A user equipment, UE, comprising:
 a processor circuit;
 a transceiver coupled to the processor circuit; and
 a memory coupled to the processor circuit, the memory comprising machine readable program instructions that, when executed by the processor circuit, cause the UE to perform operations according to any of Embodiments 1 to 17.

Embodiment 19. A user equipment, UE, comprising:
 a receiver module for receiving an access command from a source node, the access command instructing the UE to access a target node and including an access configuration specifying one or more valid target node beams for which non-random access channel, RACH, based access is configured at the target node; and
 an access module for accessing the target node using the access configuration.

Embodiment 20. A method by a node in a wireless communication system, comprising:
 preparing an access command for instructing a user equipment, UE, that is connected to a source node to access a target node, the access command including an access configuration specifying one or more valid target node beams for which non-random access channel, RACH, based access is configured at the target node; and transmitting the access command toward the UE.

Embodiment 21. The method of Embodiment 20, further comprising inserting into the access command a resource grant for performing the non-RACH based access to the target node. done by target Embodiment 22. The method of Embodiment 20 or 21, further comprising:

informing the target node of the transmission of the access command to the UE.

Embodiment 23. The method of any of Embodiments 20 to 22, wherein the access command comprises a radio resource control, RRC, message.

Embodiment 24. The method of any of Embodiments 20 to 23, wherein the access command comprises an RRCConnectionReconfiguration message.

Embodiment 25. The method of any previous Embodiment, wherein the access command comprises a handover command.

Embodiment 26. The method of any of Embodiments 20 to 25, wherein the access command comprises a secondary cell group, SCG, modification command.

Embodiment 27. A network node, comprising:
a processor circuit;
a transceiver coupled to the processor circuit; and
a memory coupled to the processor circuit, the memory comprising machine readable program instructions that, when executed by the processor circuit, cause the UE to perform operations comprising operations according to any of Embodiments 20 to 26.

Embodiment 28. A network node, comprising:
an access control module for preparing an access command for instructing a user equipment, UE, that is connected to the source node to access a target node, the access command including an access configuration specifying one or more valid target node beams for which non-random access channel, RACH, based access is configured at the target node; and
a transmitter module for transmitting the access command to the UE.

Embodiment 20. A method by a target node in a wireless communication system, comprising:

preparing an access command for instructing a user equipment, UE, that is connected to the source node to access a target node, the access command including an access configuration specifying one or more valid target node beams for which non-random access channel, RACH, based access is configured at the target node; and transmitting the access command to the source node.

Explanations for abbreviations from the above disclosure are provided below.

| Abbreviation | Explanation |
| --- | --- |
| 3GPP | 3rd Generation Partnership Project |
| AMF | Access and Mobility Management Function |
| ARQ | Automatic Repeat Request |
| C-RNTI | Cell Radio Network Temporary Identifier |
| DL | Downlink |
| eNB | Evolved NodeB (a radio base station in LTE) |
| gNB | A radio base station in NR. |
| GNSS | Global Navigation Satellite System |
| GPS | Global Positioning System |
| HARQ | Hybrid Automatic Repeat Request |
| HO | Handover |
| LTE | Long Term Evolution |
| MCS | Modulation and Coding Scheme |
| MIB | Master Information Block |
| MME | Mobility Management Entity |
| Msg | Message |
| NR | New Radio |
| NTP | Network Time Protocol |
| PBCH | Physical Broadcast Channel |
| PCell | Primary Cell |
| PDCCH | Physical Downlink Control Channel |
| PSCell | Primary Secondary Cell |
| PSS | Primary Synchronization Signal |
| PUSCH | Physical Uplink Shared Channel |
| RACH | Random Access Channel |
| RRC | Radio Resource Control |
| SCell | Secondary Cell |
| SCG | Secondary Cell Group |
| SFN | System Frame Number |
| SSS | Secondary Synchronization Signal |
| TA | Timing Advance |
| TDD | Time Division Duplex |
| UE | User Equipment |
| UL | Uplink |
| X2 | The interface/reference point between two eNBs. |
| Xn | The interface/reference point between two gNBs. |

REFERENCES

3GPP TS 36.300
3GPP TS 38.300

Further definitions and embodiments are discussed below.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus, a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components, or functions but does not preclude the presence or addition of one or more other features, integers, elements, steps, components, functions, or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

Additional explanation is provided below.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

FIG. 11: A wireless network in accordance with some embodiments.

Although the subject matter described herein may be implemented in any appropriate type of system using any suitable components, the embodiments disclosed herein are described in relation to a wireless network, such as the example wireless network illustrated in FIG. 11. For simplicity, the wireless network of FIG. 11 only depicts network QQ106, network nodes QQ160 and QQ160b, and WDs QQ110, QQ110b, and QQ110c (also referred to as mobile terminals). In practice, a wireless network may further include any additional elements suitable to support communication between wireless devices or between a wireless device and another communication device, such as a landline telephone, a service provider, or any other network node or end device. Of the illustrated components, network node QQ160 and wireless device (WD) QQ110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network QQ106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node QQ160 and WD QQ110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multi-cast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 11, network node QQ160 includes processing circuitry QQ170, device readable medium QQ180, interface QQ190, auxiliary equipment QQ184, power source QQ186, power circuitry QQ187, and antenna QQ162. Although network node QQ160 illustrated in the example wireless network of FIG. 11 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node QQ160 are depicted as single boxes located within a larger box, or nested within multiple boxes, in practice, a network node may comprise multiple different physical components that make up a single illustrated component (e.g., device readable medium QQ180 may comprise multiple separate hard drives as well as multiple RAM modules).

Similarly, network node QQ160 may be composed of multiple physically separate components (e.g., a NodeB component and a RNC component, or a BTS component and a BSC component, etc.), which may each have their own respective components. In certain scenarios in which network node QQ160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node QQ160 may be configured to support multiple radio access technologies (RATs). In such embodiments, some components may be duplicated (e.g., separate device readable medium QQ180 for the different RATs) and some components may be reused (e.g., the same antenna QQ162 may be shared by the RATs). Network node QQ160 may also include multiple sets of the various illustrated components for different wireless technologies integrated into network node QQ160, such as, for example, GSM, WCDMA, LTE, NR, WiFi, or Bluetooth wireless technologies. These wireless technologies may be integrated into the same or different chip or set of chips and other components within network node QQ160.

Processing circuitry QQ170 is configured to perform any determining, calculating, or similar operations (e.g., certain obtaining operations) described herein as being provided by a network node. These operations performed by processing circuitry QQ170 may include processing information obtained by processing circuitry QQ170 by, for example, converting the obtained information into other information, comparing the obtained information or converted information to information stored in the network node, and/or performing one or more operations based on the obtained information or converted information, and as a result of said processing making a determination.

Processing circuitry QQ170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node QQ160 components, such as device readable medium QQ180, network node QQ160 functionality. For example, processing circuitry QQ170 may execute instructions stored in device readable medium QQ180 or in memory within processing circuitry QQ170. Such functionality may include providing any of the various wireless features, functions, or benefits discussed herein. In some embodiments, processing circuitry QQ170 may include a system on a chip (SOC).

In some embodiments, processing circuitry QQ170 may include one or more of radio frequency (RF) transceiver circuitry QQ172 and baseband processing circuitry QQ174. In some embodiments, radio frequency (RF) transceiver circuitry QQ172 and baseband processing circuitry QQ174 may be on separate chips (or sets of chips), boards, or units, such as radio units and digital units. In alternative embodiments, part or all of RF transceiver circuitry QQ172 and baseband processing circuitry QQ174 may be on the same chip or set of chips, boards, or units.

In certain embodiments, some or all of the functionality described herein as being provided by a network node, base station, eNB or other such network device may be performed by processing circuitry QQ170 executing instructions stored on device readable medium QQ180 or memory within processing circuitry QQ170. In alternative embodiments, some or all of the functionality may be provided by processing circuitry QQ170 without executing instructions stored on a separate or discrete device readable medium, such as in a hard-wired manner. In any of those embodiments, whether executing instructions stored on a device readable storage medium or not, processing circuitry QQ170 can be configured to perform the described functionality. The benefits provided by such functionality are not limited to processing circuitry QQ170 alone or to other components of network node QQ160, but are enjoyed by network node QQ160 as a whole, and/or by end users and the wireless network generally.

Device readable medium QQ180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry QQ170. Device readable medium QQ180 may store any suitable instructions, data or information, including a computer program, software, an application including one or more of logic, rules, code, tables, etc. and/or other instructions capable of being executed by processing circuitry QQ170 and, utilized by network node QQ160. Device readable medium QQ180 may be used to store any calculations made by processing circuitry QQ170 and/or any data received via interface QQ190. In some embodiments, processing circuitry QQ170 and device readable medium QQ180 may be considered to be integrated.

Interface QQ190 is used in the wired or wireless communication of signalling and/or data between network node QQ160, network QQ106, and/or WDs QQ110. As illustrated, interface QQ190 comprises port(s)/terminal(s) QQ194 to send and receive data, for example to and from network QQ106 over a wired connection. Interface QQ190 also includes radio front end circuitry QQ192 that may be coupled to, or in certain embodiments a part of, antenna QQ162. Radio front end circuitry QQ192 comprises filters QQ198 and amplifiers QQ196. Radio front end circuitry QQ192 may be connected to antenna QQ162 and processing circuitry QQ170. Radio front end circuitry may be configured to condition signals communicated between antenna QQ162 and processing circuitry QQ170. Radio front end circuitry QQ192 may receive digital data that is to be sent out to other network nodes or WDs via a wireless connection. Radio front end circuitry QQ192 may convert the digital data into a radio signal having the appropriate channel and bandwidth parameters using a combination of filters QQ198 and/or amplifiers QQ196. The radio signal may then be transmitted via antenna QQ162. Similarly, when receiving data, antenna QQ162 may collect radio signals which are then converted into digital data by radio front end circuitry QQ192. The digital data may be passed to processing circuitry QQ170. In other embodiments, the interface may comprise different components and/or different combinations of components.

In certain alternative embodiments, network node QQ160 may not include separate radio front end circuitry QQ192, instead, processing circuitry QQ170 may comprise radio front end circuitry and may be connected to antenna QQ162 without separate radio front end circuitry QQ192. Similarly, in some embodiments, all or some of RF transceiver circuitry QQ172 may be considered a part of interface QQ190. In still other embodiments, interface QQ190 may include one or more ports or terminals QQ194, radio front end circuitry QQ192, and RF transceiver circuitry QQ172, as part of a radio unit (not shown), and interface QQ190 may communicate with baseband processing circuitry QQ174, which is part of a digital unit (not shown).

Antenna QQ162 may include one or more antennas, or antenna arrays, configured to send and/or receive wireless signals. Antenna QQ162 may be coupled to radio front end circuitry QQ190 and may be any type of antenna capable of transmitting and receiving data and/or signals wirelessly. In some embodiments, antenna QQ162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna QQ162 may be separate from network node QQ160 and may be connectable to network node QQ160 through an interface or port.

Antenna QQ162, interface QQ190, and/or processing circuitry QQ170 may be configured to perform any receiving operations and/or certain obtaining operations described herein as being performed by a network node. Any information, data and/or signals may be received from a wireless device, another network node and/or any other network equipment. Similarly, antenna QQ162, interface QQ190, and/or processing circuitry QQ170 may be configured to perform any transmitting operations described herein as being performed by a network node. Any information, data and/or signals may be transmitted to a wireless device, another network node and/or any other network equipment.

Power circuitry QQ187 may comprise, or be coupled to, power management circuitry and is configured to supply the components of network node QQ160 with power for performing the functionality described herein. Power circuitry QQ187 may receive power from power source QQ186. Power source QQ186 and/or power circuitry QQ187 may be configured to provide power to the various components of network node QQ160 in a form suitable for the respective components (e.g., at a voltage and current level needed for each respective component). Power source QQ186 may either be included in, or external to, power circuitry QQ187 and/or network node QQ160. For example, network node QQ160 may be connectable to an external power source (e.g., an electricity outlet) via an input circuitry or interface such as an electrical cable, whereby the external power source supplies power to power circuitry QQ187. As a further example, power source QQ186 may comprise a source of power in the form of a battery or battery pack which is connected to, or integrated in, power circuitry QQ187. The battery may provide backup power should the external power source fail. Other types of power sources, such as photovoltaic devices, may also be used.

Alternative embodiments of network node QQ160 may include additional components beyond those shown in FIG. 11 that may be responsible for providing certain aspects of the network node's functionality, including any of the functionality described herein and/or any functionality necessary to support the subject matter described herein. For example, network node QQ160 may include user interface equipment to allow input of information into network node QQ160 and to allow output of information from network node QQ160. This may allow a user to perform diagnostic, maintenance, repair, and other administrative functions for network node QQ160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device QQ110 includes antenna QQ111, interface QQ114, processing circuitry QQ120, device readable medium QQ130, user interface equipment QQ132, auxiliary equipment QQ134, power source QQ136 and power circuitry QQ137. WD QQ110 may include multiple sets of one or more of the illustrated components for different wireless technologies supported by WD QQ110, such as, for example, GSM, WCDMA, LTE, NR, WiFi, WiMAX, or Bluetooth wireless technologies, just to mention a few. These wireless technologies may be integrated into the same or different chips or set of chips as other components within WD QQ110.

Antenna QQ111 may include one or more antennas or antenna arrays, configured to send and/or receive wireless signals, and is connected to interface QQ114. In certain alternative embodiments, antenna QQ111 may be separate from WD QQ110 and be connectable to WD QQ110 through an interface or port. Antenna QQ111, interface QQ114, and/or processing circuitry QQ120 may be configured to perform any receiving or transmitting operations described herein as being performed by a WD. Any information, data and/or signals may be received from a network node and/or another WD. In some embodiments, radio front end circuitry and/or antenna QQ111 may be considered an interface.

As illustrated, interface QQ114 comprises radio front end circuitry QQ112 and antenna QQ111. Radio front end circuitry QQ112 comprise one or more filters QQ118 and amplifiers QQ116. Radio front end circuitry QQ114 is connected to antenna QQ111 and processing circuitry QQ120, and is configured to condition signals communicated between antenna QQ111 and processing circuitry QQ120. Radio front end circuitry QQ112 may be coupled to or a part of antenna QQ111. In some embodiments, WD QQ110 may not include separate radio front end circuitry QQ112; rather, processing circuitry QQ120 may comprise radio front end circuitry and may be connected to antenna QQ111. Similarly, in some embodiments, some or all of RF transceiver circuitry QQ122 may be considered a part of interface QQ114. Radio front end circuitry QQ112 may receive digital data that is to be sent out to other network nodes or WDs via a wireless connection. Radio front end circuitry QQ112 may convert the digital data into a radio signal having the appropriate channel and bandwidth parameters using a combination of filters QQ118 and/or amplifiers QQ116. The radio signal may then be transmitted via antenna QQ111. Similarly, when receiving data, antenna QQ111 may collect radio signals which are then converted into digital data by radio front end circuitry QQ112. The digital data may be passed to processing circuitry QQ120. In other embodiments, the interface may comprise different components and/or different combinations of components.

Processing circuitry QQ120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD QQ110 components, such as device readable medium QQ130, WD QQ110 functionality. Such functionality may include providing any of the various wireless features or benefits discussed herein. For example, processing circuitry QQ120 may execute instructions stored in device readable medium QQ130 or in memory within processing circuitry QQ120 to provide the functionality disclosed herein.

As illustrated, processing circuitry QQ120 includes one or more of RF transceiver circuitry QQ122, baseband processing circuitry QQ124, and application processing circuitry QQ126. In other embodiments, the processing circuitry may comprise different components and/or different combinations of components. In certain embodiments processing circuitry QQ120 of WD QQ110 may comprise a SOC. In some embodiments, RF transceiver circuitry QQ122, baseband processing circuitry QQ124, and application processing circuitry QQ126 may be on separate chips or sets of chips. In alternative embodiments, part or all of baseband processing circuitry QQ124 and application processing circuitry QQ126 may be combined into one chip or set of chips, and RF transceiver circuitry QQ122 may be on a separate chip or set of chips. In still alternative embodiments, part or all of RF transceiver circuitry QQ122 and baseband processing circuitry QQ124 may be on the same chip or set of chips, and application processing circuitry QQ126 may be on a separate chip or set of chips. In yet other alternative embodiments, part or all of RF transceiver circuitry QQ122, baseband processing circuitry QQ124, and application processing circuitry QQ126 may be combined in the same chip or set of chips. In some embodiments, RF transceiver circuitry QQ122 may be a part of interface QQ114. RF transceiver circuitry QQ122 may condition RF signals for processing circuitry QQ120.

In certain embodiments, some or all of the functionality described herein as being performed by a WD may be provided by processing circuitry QQ120 executing instructions stored on device readable medium QQ130, which in certain embodiments may be a computer-readable storage medium. In alternative embodiments, some or all of the functionality may be provided by processing circuitry QQ120 without executing instructions stored on a separate or discrete device readable storage medium, such as in a hard-wired manner. In any of those particular embodiments, whether executing instructions stored on a device readable storage medium or not, processing circuitry QQ120 can be configured to perform the described functionality. The benefits provided by such functionality are not limited to processing circuitry QQ120 alone or to other components of WD QQ110, but are enjoyed by WD QQ110 as a whole, and/or by end users and the wireless network generally.

Processing circuitry QQ120 may be configured to perform any determining, calculating, or similar operations (e.g., certain obtaining operations) described herein as being performed by a WD. These operations, as performed by processing circuitry QQ120, may include processing information obtained by processing circuitry QQ120 by, for example, converting the obtained information into other information, comparing the obtained information or converted information to information stored by WD QQ110, and/or performing one or more operations based on the obtained information or converted information, and as a result of said processing making a determination.

Device readable medium QQ130 may be operable to store a computer program, software, an application including one or more of logic, rules, code, tables, etc. and/or other instructions capable of being executed by processing circuitry QQ120. Device readable medium QQ130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry QQ120. In some embodiments, processing circuitry QQ120 and device readable medium QQ130 may be considered to be integrated. User interface equipment QQ132 may provide components that allow for a human user to interact with WD QQ110. Such interaction may be of many forms, such as visual, audial, tactile, etc. User interface equipment QQ132 may be operable to produce output to the user and to allow the user to provide input to WD QQ110. The type of interaction may vary depending on the type of user interface equipment QQ132 installed in WD QQ110. For example, if WD QQ110 is a smart phone, the interaction may be via a touch screen; if WD QQ110 is a smart meter, the interaction may be through a screen that provides usage (e.g., the number of gallons used) or a speaker that provides an audible alert (e.g., if smoke is detected). User interface equipment QQ132 may include input interfaces, devices and circuits, and output interfaces, devices and circuits. User interface equipment QQ132 is configured to allow input of information into WD QQ110, and is connected to processing circuitry QQ120 to allow processing circuitry QQ120 to process the input information. User interface equipment QQ132 may include, for example, a microphone, a proximity or other sensor, keys/buttons, a touch display, one or more cameras, a USB port, or other input circuitry. User interface equipment QQ132 is also configured to allow output of information from WD QQ110, and to allow processing circuitry QQ120 to output information from WD QQ110. User interface equipment QQ132 may include, for example, a speaker, a display, vibrating circuitry, a USB port, a headphone interface, or other output circuitry. Using one or more input and output interfaces, devices, and circuits, of user interface equipment QQ132, WD QQ110 may communicate with end users and/or the wireless network, and allow them to benefit from the functionality described herein.

Auxiliary equipment QQ134 is operable to provide more specific functionality which may not be generally performed by WDs. This may comprise specialized sensors for doing measurements for various purposes, interfaces for additional types of communication such as wired communications etc. The inclusion and type of components of auxiliary equipment QQ134 may vary depending on the embodiment and/or scenario.

Power source QQ136 may, in some embodiments, be in the form of a battery or battery pack. Other types of power sources, such as an external power source (e.g., an electricity outlet), photovoltaic devices or power cells, may also be used. WD QQ110 may further comprise power circuitry QQ137 for delivering power from power source QQ136 to the various parts of WD QQ110 which need power from power source QQ136 to carry out any functionality described or indicated herein. Power circuitry QQ137 may in certain embodiments comprise power management circuitry. Power circuitry QQ137 may additionally or alternatively be operable to receive power from an external power source; in which case WD QQ110 may be connectable to the external power source (such as an electricity outlet) via input circuitry or an interface such as an electrical power cable. Power circuitry QQ137 may also in certain embodiments be operable to deliver power from an external power source to power source QQ136. This may be, for example, for the charging of power source QQ136. Power circuitry QQ137 may perform any formatting, converting, or other modification to the power from power source QQ136 to make the power suitable for the respective components of WD QQ110 to which power is supplied.

Figure 12:
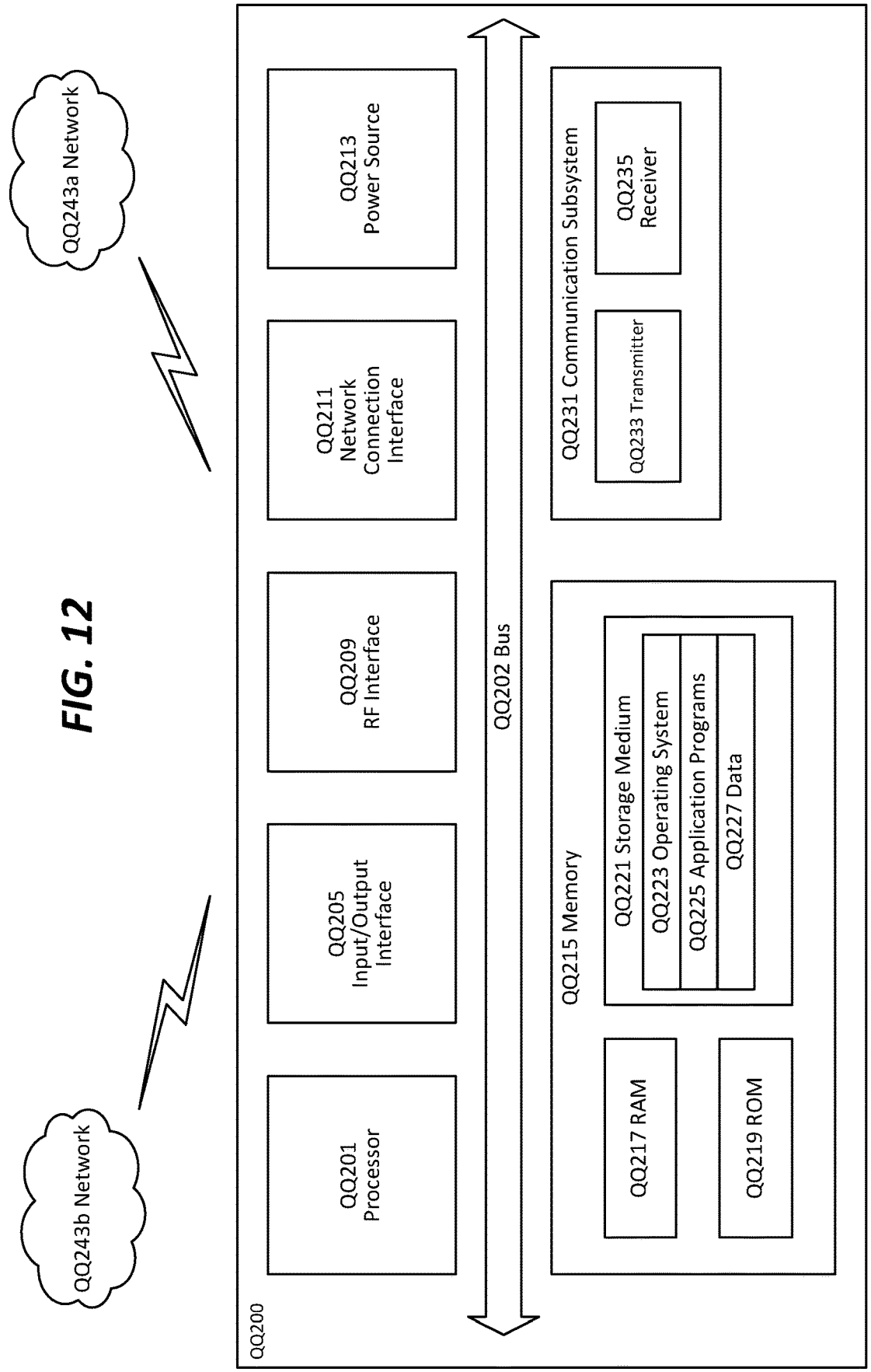
FIG. 12 is a block diagram of a user equipment in accordance with some embodiments

FIG. 12: User Equipment in accordance with some embodiments

FIG. 12 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE QQ2200 may be any UE identified by the 3rd Generation Partnership Project (3GPP), including a NB-IoT UE, a machine type communication (MTC) UE, and/or an enhanced MTC (eMTC) UE. UE QQ200, as illustrated in FIG. 12, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 12 is a UE, the components discussed herein are equally applicable to a WD, and vice-versa.

In FIG. 12, UE QQ200 includes processing circuitry QQ201 that is operatively coupled to input/output interface QQ205, radio frequency (RF) interface QQ209, network connection interface QQ211, memory QQ215 including random access memory (RAM) QQ217, read-only memory (ROM) QQ219, and storage medium QQ221 or the like, communication subsystem QQ231, power source QQ233, and/or any other component, or any combination thereof. Storage medium QQ221 includes operating system QQ223, application program QQ225, and data QQ227. In other embodiments, storage medium QQ221 may include other similar types of information. Certain UEs may utilize all of the components shown in FIG. 12, or only a subset of the components. The level of integration between the components may vary from one UE to another UE. Further, certain UEs may contain multiple instances of a component, such as multiple processors, memories, transceivers, transmitters, receivers, etc.

In FIG. 12, processing circuitry QQ201 may be configured to process computer instructions and data. Processing circuitry QQ201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry QQ201 may include two central processing units (CPUs). Data may be information in a form suitable for use by a computer.

In the depicted embodiment, input/output interface QQ205 may be configured to provide a communication interface to an input device, output device, or input and output device. UE QQ200 may be configured to use an output device via input/output interface QQ205. An output device may use the same type of interface port as an input device. For example, a USB port may be used to provide input to and output from UE QQ200. The output device may be a speaker, a sound card, a video card, a display, a monitor, a printer, an actuator, an emitter, a smartcard, another output device, or any combination thereof. UE QQ200 may be configured to use an input device via input/output interface QQ205 to allow a user to capture information into UE QQ200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 12, RF interface QQ209 may be configured to provide a communication interface to RF components such as a transmitter, a receiver, and an antenna. Network connection interface QQ211 may be configured to provide a communication interface to network QQ243a. Network QQ243a may encompass wired and/or wireless networks such as a local-area network (LAN), a wide-area network (WAN), a computer network, a wireless network, a telecommunications network, another like network or any combination thereof. For example, network QQ243a may comprise a Wi-Fi network. Network connection interface QQ211 may be configured to include a receiver and a transmitter interface used to communicate with one or more other devices over a communication network according to one or more communication protocols, such as Ethernet, TCP/IP, SONET, ATM, or the like. Network connection interface QQ211 may implement receiver and transmitter functionality appropriate to the communication network links (e.g., optical, electrical, and the like). The transmitter and receiver functions may share circuit components, software or firmware, or alternatively may be implemented separately.

RAM QQ217 may be configured to interface via bus QQ202 to processing circuitry QQ201 to provide storage or caching of data or computer instructions during the execution of software programs such as the operating system, application programs, and device drivers. ROM QQ219 may be configured to provide computer instructions or data to processing circuitry QQ201. For example, ROM QQ219 may be configured to store invariant low-level system code or data for basic system functions such as basic input and output (I/O), startup, or reception of keystrokes from a keyboard that are stored in a non-volatile memory. Storage medium QQ221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium QQ221 may be configured to include operating system QQ223, application program QQ225 such as a web browser application, a widget or gadget engine or another application, and data file QQ227. Storage medium QQ221 may store, for use by UE QQ200, any of a variety of various operating systems or combinations of operating systems.

Storage medium QQ221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium QQ221 may allow UE QQ200 to access computer-executable instructions, application programs or the like, stored on transitory or non-transitory memory media, to off-load data, or to upload data. An article of manufacture, such as one utilizing a communication system may be tangibly embodied in storage medium QQ221, which may comprise a device readable medium.

In FIG. 12, processing circuitry QQ201 may be configured to communicate with network QQ243b using communication subsystem QQ231. Network QQ243a and network QQ243b may be the same network or networks or different network or networks. Communication subsystem QQ231 may be configured to include one or more transceivers used to communicate with network QQ243b. For example, communication subsystem QQ231 may be configured to include one or more transceivers used to communicate with one or more remote transceivers of another device capable of wireless communication such as another WD, UE, or base station of a radio access network (RAN) according to one or more communication protocols, such as IEEE 802.QQ2, CDMA, WCDMA, GSM, LTE, UTRAN, WiMax, or the like. Each transceiver may include transmitter QQ233 and/or receiver QQ235 to implement transmitter or receiver functionality, respectively, appropriate to the RAN links (e.g., frequency allocations and the like). Further, transmitter QQ233 and receiver QQ235 of each transceiver may share circuit components, software or firmware, or alternatively may be implemented separately.

In the illustrated embodiment, the communication functions of communication subsystem QQ231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem QQ231 may include cellular communication, Wi-Fi communication, Bluetooth communication, and GPS communication. Network QQ243b may encompass wired and/or wireless networks such as a local-area network (LAN), a wide-area network (WAN), a computer network, a wireless network, a telecommunications network, another like network or any combination thereof. For example, network QQ243b may be a cellular network, a Wi-Fi network, and/or a near-field network. Power source QQ213 may be configured to provide alternating current (AC) or direct current (DC) power to components of UE QQ200.

The features, benefits and/or functions described herein may be implemented in one of the components of UE QQ200 or partitioned across multiple components of UE QQ200. Further, the features, benefits, and/or functions described herein may be implemented in any combination of hardware, software or firmware. In one example, communication subsystem QQ231 may be configured to include any of the components described herein. Further, processing circuitry QQ201 may be configured to communicate with any of such components over bus QQ202. In another example, any of such components may be represented by program instructions stored in memory that when executed by processing circuitry QQ201 perform the corresponding functions described herein. In another example, the functionality of any of such components may be partitioned between processing circuitry QQ201 and communication subsystem QQ231. In another example, the non-computationally intensive functions of any of such components may be implemented in software or firmware and the computationally intensive functions may be implemented in hardware.

Figure 13:
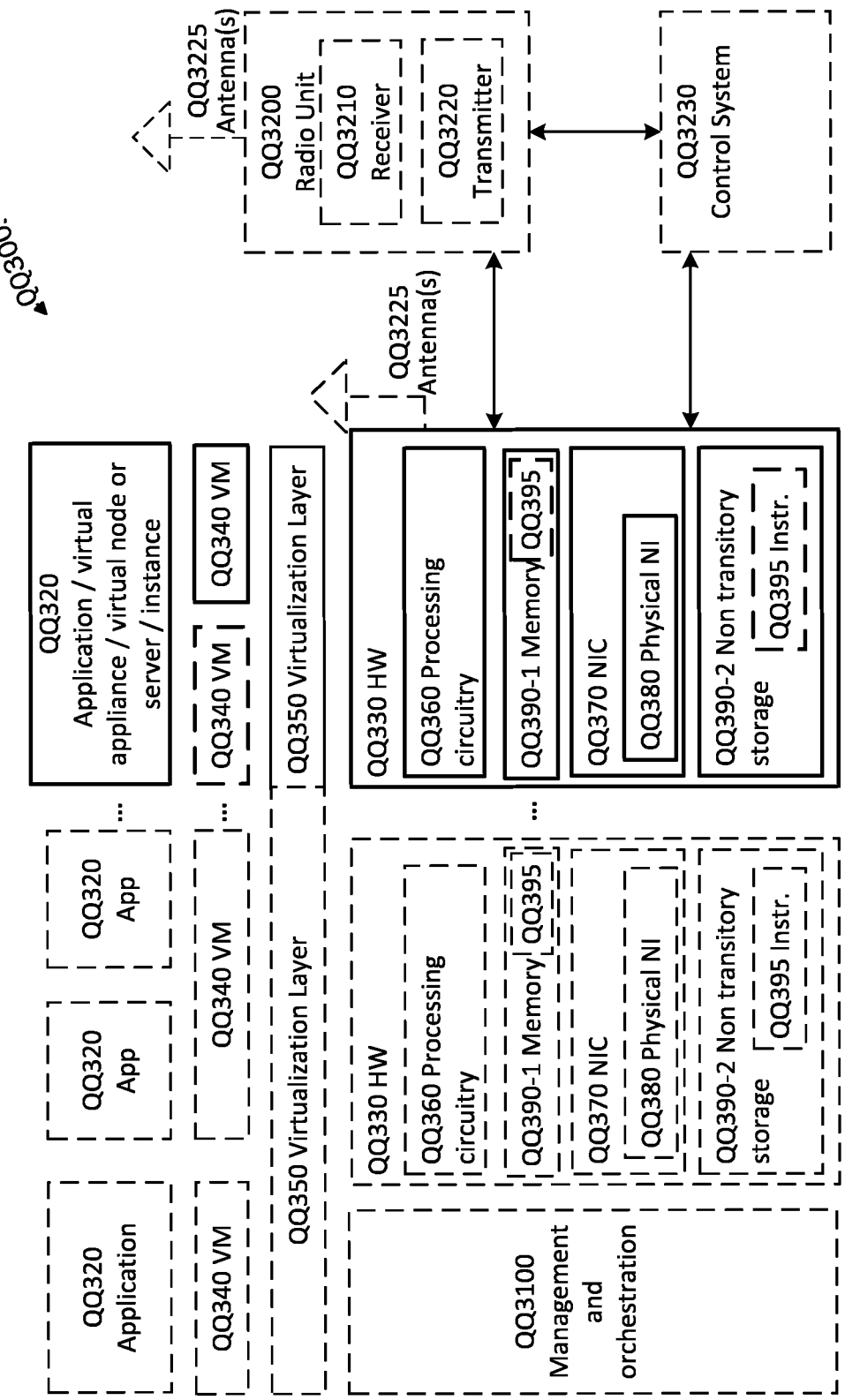
FIG. 13 is a block diagram of a virtualization environment in accordance with some embodiments.

FIG. 13: Virtualization environment in accordance with some embodiments

FIG. 13 is a schematic block diagram illustrating a virtualization environment QQ300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments QQ300 hosted by one or more of hardware nodes QQ330. Further, in embodiments in which the virtual node is not a radio access node or does not require radio connectivity (e.g., a core network node), then the network node may be entirely virtualized.

The functions may be implemented by one or more applications QQ320 (which may alternatively be called software instances, virtual appliances, network functions, virtual nodes, virtual network functions, etc.) operative to implement some of the features, functions, and/or benefits of some of the embodiments disclosed herein. Applications QQ320 are run in virtualization environment QQ300 which provides hardware QQ330 comprising processing circuitry QQ360 and memory QQ390. Memory QQ390 contains instructions QQ395 executable by processing circuitry QQ360 whereby application QQ320 is operative to provide one or more of the features, benefits, and/or functions disclosed herein.

Virtualization environment QQ300, comprises general-purpose or special-purpose network hardware devices QQ330 comprising a set of one or more processors or processing circuitry QQ360, which may be commercial off-the-shelf (COTS) processors, dedicated Application Specific Integrated Circuits (ASICs), or any other type of processing circuitry including digital or analog hardware components or special purpose processors. Each hardware device may comprise memory QQ390-1 which may be non-persistent memory for temporarily storing instructions QQ395 or software executed by processing circuitry QQ360. Each hardware device may comprise one or more network interface controllers (NICs) QQ370, also known as network interface cards, which include physical network interface QQ380. Each hardware device may also include non-transitory, persistent, machine-readable storage media QQ390-2 having stored therein software QQ395 and/or instructions executable by processing circuitry QQ360. Software QQ395 may include any type of software including software for instantiating one or more virtualization layers QQ350 (also referred to as hypervisors), software to execute virtual machines QQ340 as well as software allowing it to execute functions, features and/or benefits described in relation with some embodiments described herein.

Virtual machines QQ340, comprise virtual processing, virtual memory, virtual networking or interface and virtual storage, and may be run by a corresponding virtualization layer QQ350 or hypervisor. Different embodiments of the instance of virtual appliance QQ320 may be implemented on one or more of virtual machines QQ340, and the implementations may be made in different ways.

During operation, processing circuitry QQ360 executes software QQ395 to instantiate the hypervisor or virtualization layer QQ350, which may sometimes be referred to as a virtual machine monitor (VMM). Virtualization layer QQ350 may present a virtual operating platform that appears like networking hardware to virtual machine QQ340.

As shown in FIG. 13, hardware QQ330 may be a standalone network node with generic or specific components. Hardware QQ330 may comprise antenna QQ3225 and may implement some functions via virtualization. Alternatively, hardware QQ330 may be part of a larger cluster of hardware (e.g. such as in a data center or customer premise equipment (CPE)) where many hardware nodes work together and are managed via management and orchestration (MANO) QQ3100, which, among others, oversees lifecycle management of applications QQ320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine QQ340 may be a software implementation of a physical machine that runs programs as if they were executing on a physical, non-virtualized machine. Each of virtual machines QQ340, and that part of hardware QQ330 that executes that virtual machine, be it hardware dedicated to that virtual machine and/or hardware shared by that virtual machine with others of the virtual machines QQ340, forms a separate virtual network elements (VNE).

Still in the context of NFV, Virtual Network Function (VNF) is responsible for handling specific network functions that run in one or more virtual machines QQ340 on top of hardware networking infrastructure QQ330 and corresponds to application QQ320 in FIG. 13.

In some embodiments, one or more radio units QQ3200 that each include one or more transmitters QQ3220 and one or more receivers QQ3210 may be coupled to one or more antennas QQ3225. Radio units QQ3200 may communicate directly with hardware nodes QQ330 via one or more appropriate network interfaces and may be used in combination with the virtual components to provide a virtual node with radio capabilities, such as a radio access node or a base station.

In some embodiments, some signalling can be effected with the use of control system QQ3230 which may alternatively be used for communication between the hardware nodes QQ330 and radio units QQ3200.

Figure 14:
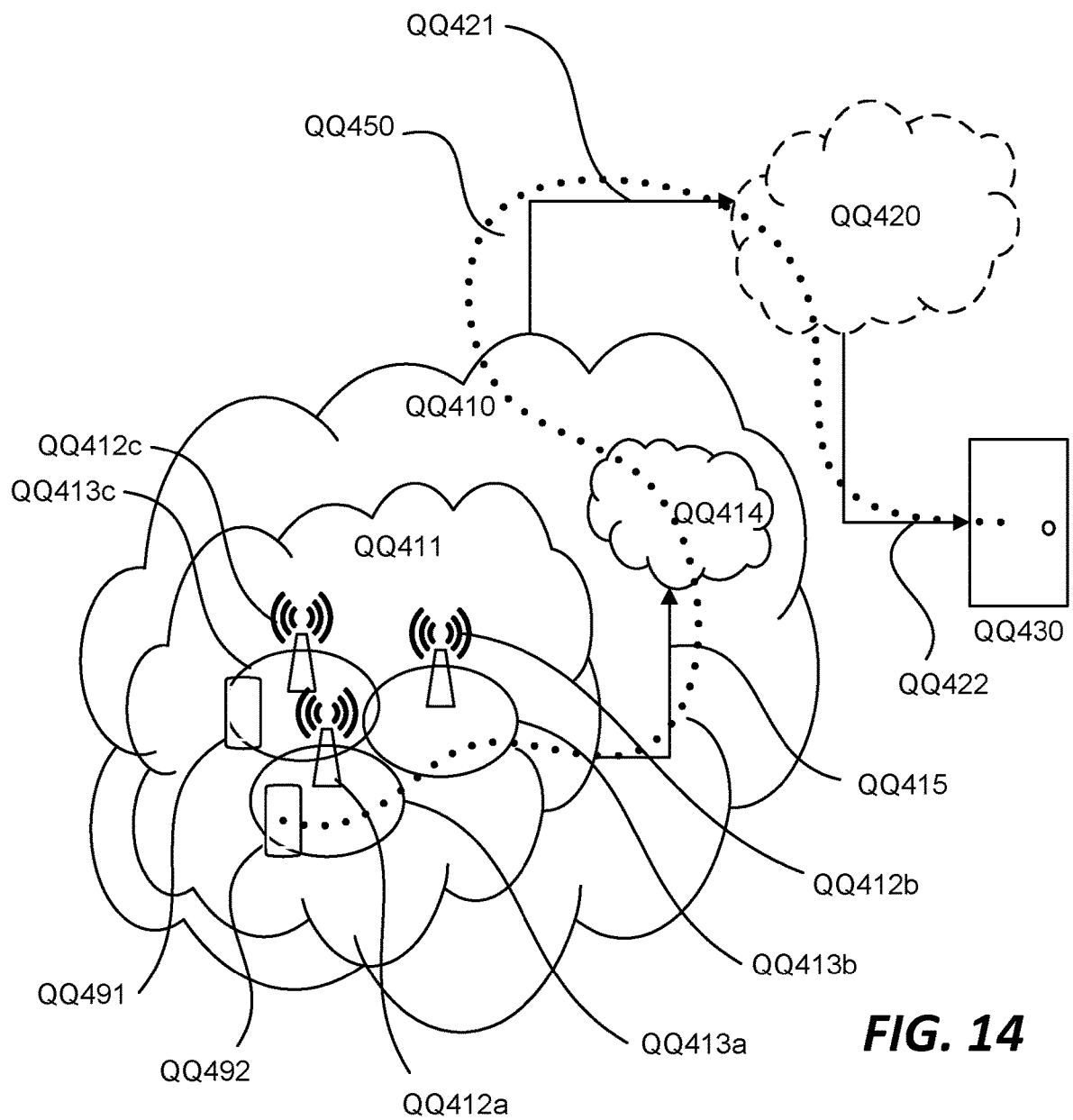
FIG. 14 is a block diagram of a telecommunication network connected via an intermediate network to a host computer in accordance with some embodiments.

FIG. 14: Telecommunication network connected via an intermediate network to a host computer in accordance with some embodiments.

With reference to FIG. 14, in accordance with an embodiment, a communication system includes telecommunication network QQ410, such as a 3GPP-type cellular network, which comprises access network QQ411, such as a radio access network, and core network QQ414. Access network QQ411 comprises a plurality of base stations QQ412a, QQ412b, QQ412c, such as NBs, eNBs, gNBs or other types of wireless access points, each defining a corresponding coverage area QQ413a, QQ413b, QQ413c. Each base station QQ412a, QQ412b, QQ412c is connectable to core network QQ414 over a wired or wireless connection QQ415. A first UE QQ491 located in coverage area QQ413c is configured to wirelessly connect to, or be paged by, the corresponding base station QQ412c. A second UE QQ492 in coverage area QQ413a is wirelessly connectable to the corresponding base station QQ412a. While a plurality of UEs QQ491, QQ492 are illustrated in this example, the disclosed embodiments are equally applicable to a situation where a sole UE is in the coverage area or where a sole UE is connecting to the corresponding base station QQ412.

Telecommunication network QQ410 is itself connected to host computer QQ430, which may be embodied in the hardware and/or software of a standalone server, a cloud-implemented server, a distributed server or as processing resources in a server farm. Host computer QQ430 may be under the ownership or control of a service provider, or may be operated by the service provider or on behalf of the service provider. Connections QQ421 and QQ422 between telecommunication network QQ410 and host computer QQ430 may extend directly from core network QQ414 to host computer QQ430 or may go via an optional intermediate network QQ420. Intermediate network QQ420 may be one of, or a combination of more than one of, a public, private or hosted network; intermediate network QQ420, if any, may be a backbone network or the Internet; in particular, intermediate network QQ420 may comprise two or more sub-networks (not shown).

The communication system of FIG. 14 as a whole enables connectivity between the connected UEs QQ491, QQ492 and host computer QQ430. The connectivity may be described as an over-the-top (OTT) connection QQ450. Host computer QQ430 and the connected UEs QQ491, QQ492 are configured to communicate data and/or signaling via OTT connection QQ450, using access network QQ411, core network QQ414, any intermediate network QQ420 and possible further infrastructure (not shown) as intermediaries. OTT connection QQ450 may be transparent in the sense that the participating communication devices through which OTT connection QQ450 passes are unaware of routing of uplink and downlink communications. For example, base station QQ412 may not or need not be informed about the past routing of an incoming downlink communication with data originating from host computer QQ430 to be forwarded (e.g., handed over) to a connected UE QQ491. Similarly, base station QQ412 need not be aware of the future routing of an outgoing uplink communication originating from the UE QQ491 towards the host computer QQ430.

Figure 15:
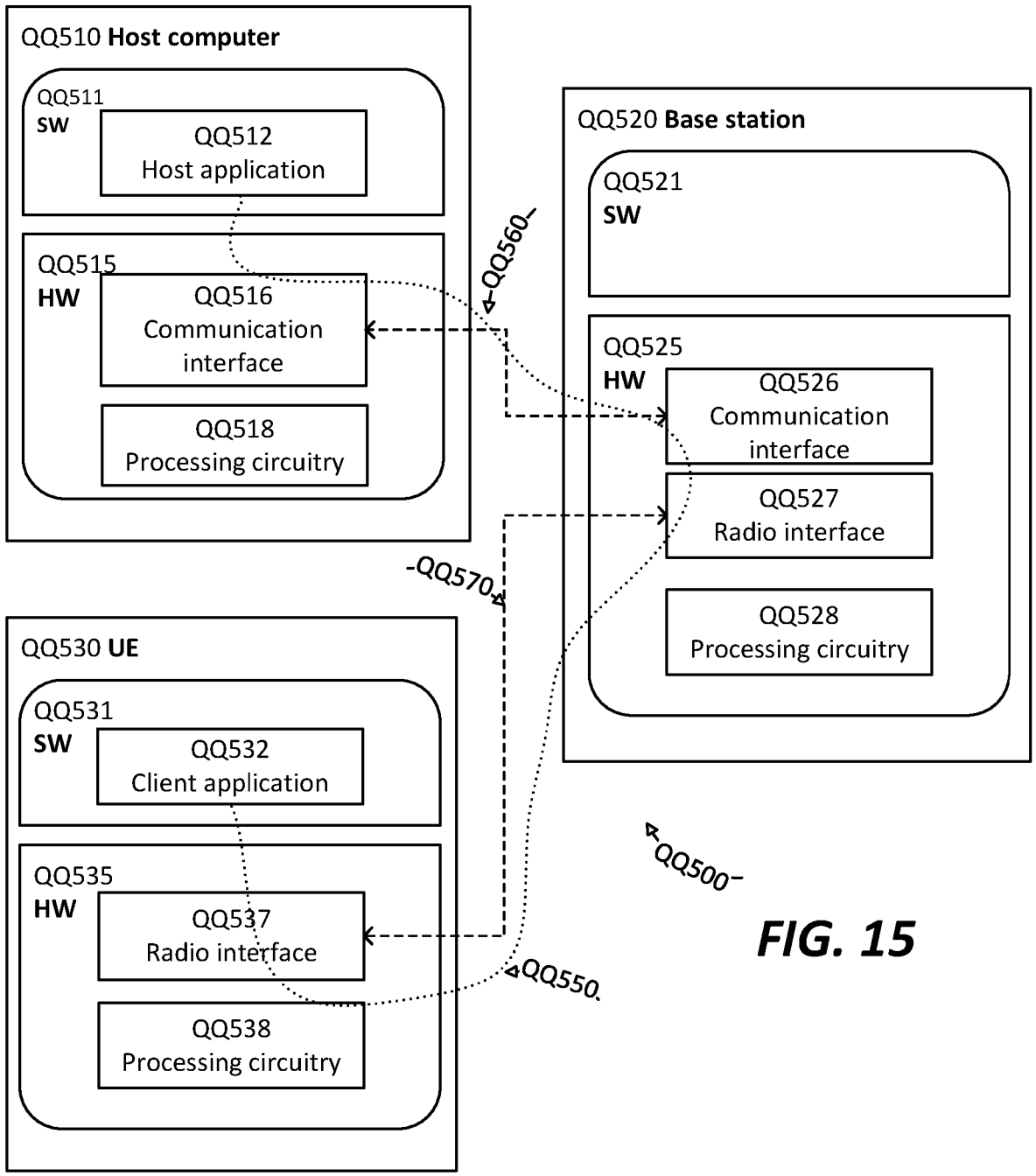
FIG. 15 is a block diagram of a host computer communicating via a base station with a user equipment over a partially wireless connection in accordance with some embodiments.

FIG. 15: Host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 15. In communication system QQ500, host computer QQ510 comprises hardware QQ515 including communication interface QQ516 configured to set up and maintain a wired or wireless connection with an interface of a different communication device of communication system QQ500. Host computer QQ510 further comprises processing circuitry QQ518, which may have storage and/or processing capabilities. In particular, processing circuitry QQ518 may comprise one or more programmable processors, application-specific integrated circuits, field programmable gate arrays or combinations of these (not shown) adapted to execute instructions. Host computer QQ510 further comprises software QQ511, which is stored in or accessible by host computer QQ510 and executable by processing circuitry QQ518. Software QQ511 includes host application QQ512. Host application QQ512 may be operable to provide a service to a remote user, such as UE QQ530 connecting via OTT connection QQ550 terminating at UE QQ530 and host computer QQ510. In providing the service to the remote user, host application QQ512 may provide user data which is transmitted using OTT connection QQ550.

Communication system QQ500 further includes base station QQ520 provided in a telecommunication system and comprising hardware QQ525 enabling it to communicate with host computer QQ510 and with UE QQ530. Hardware QQ525 may include communication interface QQ526 for setting up and maintaining a wired or wireless connection with an interface of a different communication device of communication system QQ500, as well as radio interface QQ527 for setting up and maintaining at least wireless connection QQ570 with UE QQ530 located in a coverage area (not shown in FIG. 15) served by base station QQ520. Communication interface QQ526 may be configured to facilitate connection QQ560 to host computer QQ510. Connection QQ560 may be direct or it may pass through a core network (not shown in FIG. 15) of the telecommunication system and/or through one or more intermediate networks outside the telecommunication system. In the embodiment shown, hardware QQ525 of base station QQ520 further includes processing circuitry QQ528, which may comprise one or more programmable processors, application-specific integrated circuits, field programmable gate arrays or combinations of these (not shown) adapted to execute instructions. Base station QQ520 further has software QQ521 stored internally or accessible via an external connection.

Communication system QQ500 further includes UE QQ530 already referred to. Its hardware QQ535 may include radio interface QQ537 configured to set up and maintain wireless connection QQ570 with a base station serving a coverage area in which UE QQ530 is currently located. Hardware QQ535 of UE QQ530 further includes processing circuitry QQ538, which may comprise one or more programmable processors, application-specific integrated circuits, field programmable gate arrays or combinations of these (not shown) adapted to execute instructions. UE QQ530 further comprises software QQ531, which is stored in or accessible by UE QQ530 and executable by processing circuitry QQ538. Software QQ531 includes client application QQ532. Client application QQ532 may be operable to provide a service to a human or non-human user via UE QQ530, with the support of host computer QQ510. In host computer QQ510, an executing host application QQ512 may communicate with the executing client application QQ532 via OTT connection QQ550 terminating at UE QQ530 and host computer QQ510. In providing the service to the user, client application QQ532 may receive request data from host application QQ512 and provide user data in response to the request data. OTT connection QQ550 may transfer both the request data and the user data. Client application QQ532 may interact with the user to generate the user data that it provides.

It is noted that host computer QQ510, base station QQ520 and UE QQ530 illustrated in FIG. 15 may be similar or identical to host computer QQ430, one of base stations QQ412a, QQ412b, QQ412c and one of UEs QQ491, QQ492 of FIG. 14, respectively. This is to say, the inner workings of these entities may be as shown in FIG. 15 and independently, the surrounding network topology may be that of FIG. 14.

In FIG. 15, OTT connection QQ550 has been drawn abstractly to illustrate the communication between host computer QQ510 and UE QQ530 via base station QQ520, without explicit reference to any intermediary devices and the precise routing of messages via these devices. Network infrastructure may determine the routing, which it may be configured to hide from UE QQ530 or from the service provider operating host computer QQ510, or both. While OTT connection QQ550 is active, the network infrastructure may further take decisions by which it dynamically changes the routing (e.g., on the basis of load balancing consideration or reconfiguration of the network).

Wireless connection QQ570 between UE QQ530 and base station QQ520 is in accordance with the teachings of the embodiments described throughout this disclosure. One or more of the various embodiments may improve the performance of OTT services provided to UE QQ530 using OTT connection QQ550, in which wireless connection QQ570 forms the last segment. More precisely, the teachings of these embodiments may improve the deblock filtering for video processing and thereby provide benefits such as improved video encoding and/or decoding.

A measurement procedure may be provided for the purpose of monitoring data rate, latency and other factors on which the one or more embodiments improve. There may further be an optional network functionality for reconfiguring OTT connection QQ550 between host computer QQ510 and UE QQ530, in response to variations in the measurement results. The measurement procedure and/or the network functionality for reconfiguring OTT connection QQ550 may be implemented in software QQ511 and hardware QQ515 of host computer QQ510 or in software QQ531 and hardware QQ535 of UE QQ530, or both. In embodiments, sensors (not shown) may be deployed in or in association with communication devices through which OTT connection QQ550 passes; the sensors may participate in the measurement procedure by supplying values of the monitored quantities exemplified above, or supplying values of other physical quantities from which software QQ511, QQ531 may compute or estimate the monitored quantities. The reconfiguring of OTT connection QQ550 may include message format, retransmission settings, preferred routing etc.; the reconfiguring need not affect base station QQ520, and it may be unknown or imperceptible to base station QQ520. Such procedures and functionalities may be known and practiced in the art. In certain embodiments, measurements may involve proprietary UE signaling facilitating host computer QQ510's measurements of throughput, propagation times, latency and the like. The measurements may be implemented in that software QQ511 and QQ531 causes messages to be transmitted, in particular empty or 'dummy' messages, using OTT connection QQ550 while it monitors propagation times, errors etc.

Figure 16:
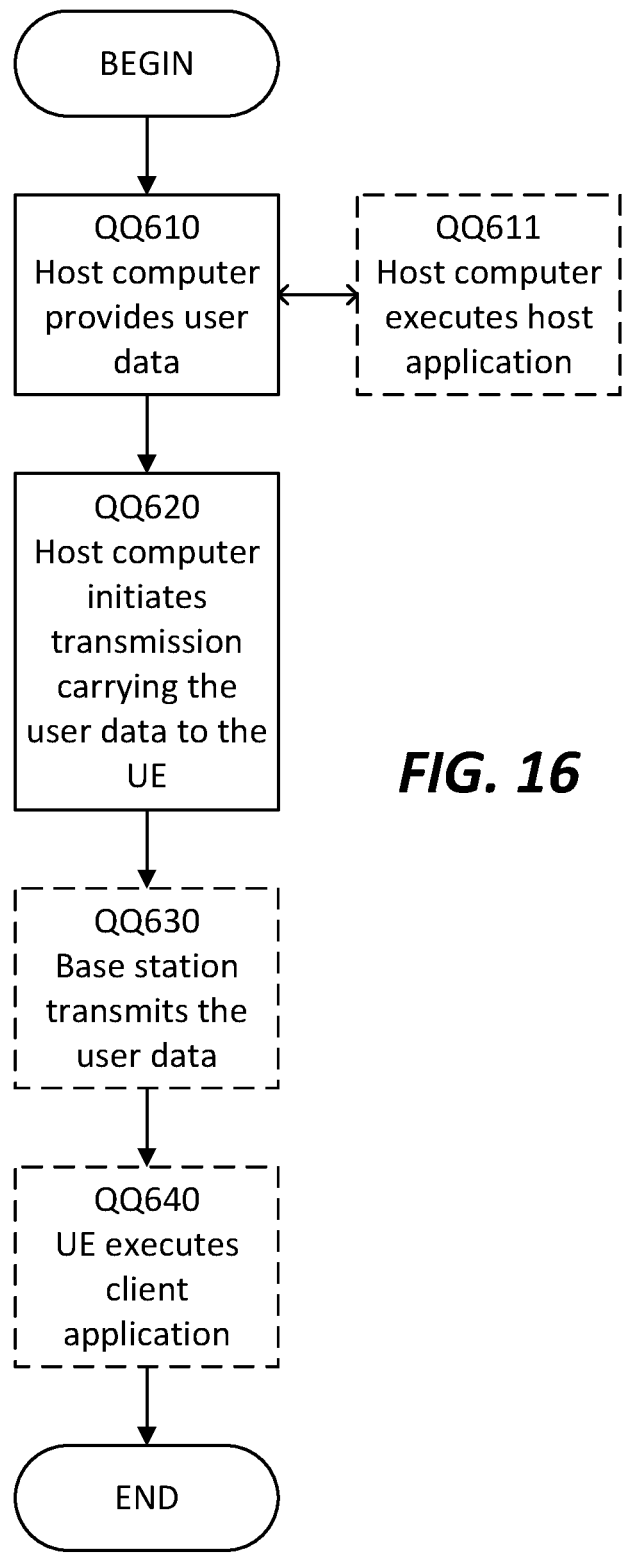
FIG. 16 is a block diagram of methods implemented in a communication system including a host computer, a base station, and a user equipment in accordance with some embodiments.

FIG. 16: Methods implemented in a communication system including a host computer, a base station and a user equipment in accordance with some embodiments.

FIG. 16 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 16 will be included in this section. In step QQ610, the host computer provides user data. In substep QQ611 (which may be optional) of step QQ610, the host computer provides the user data by executing a host application. In step QQ620, the host computer initiates a transmission carrying the user data to the UE. In step QQ630 (which may be optional), the base station transmits to the UE the user data which was carried in the transmission that the host computer initiated, in accordance with the teachings of the embodiments described throughout this disclosure. In step QQ640 (which may also be optional), the UE executes a client application associated with the host application executed by the host computer.

Figure 17:
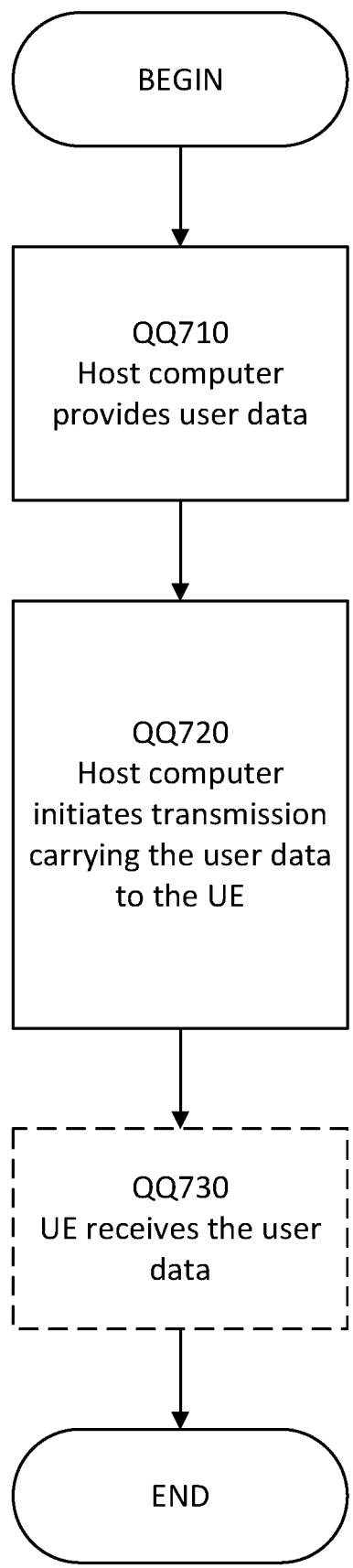
FIG. 17 is a block diagram of methods implemented in a communication system including a host computer, a base station, and a user equipment in accordance with some embodiments.

FIG. 17: Methods implemented in a communication system including a host computer, a base station and a user equipment in accordance with some embodiments.

FIG. 17 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 17 will be included in this section. In step QQ710 of the method, the host computer provides user data. In an optional substep (not shown) the host computer provides the user data by executing a host application. In step QQ720, the host computer initiates a transmission carrying the user data to the UE. The transmission may pass via the base station, in accordance with the teachings of the embodiments described throughout this disclosure. In step QQ730 (which may be optional), the UE receives the user data carried in the transmission.

Figure 18:
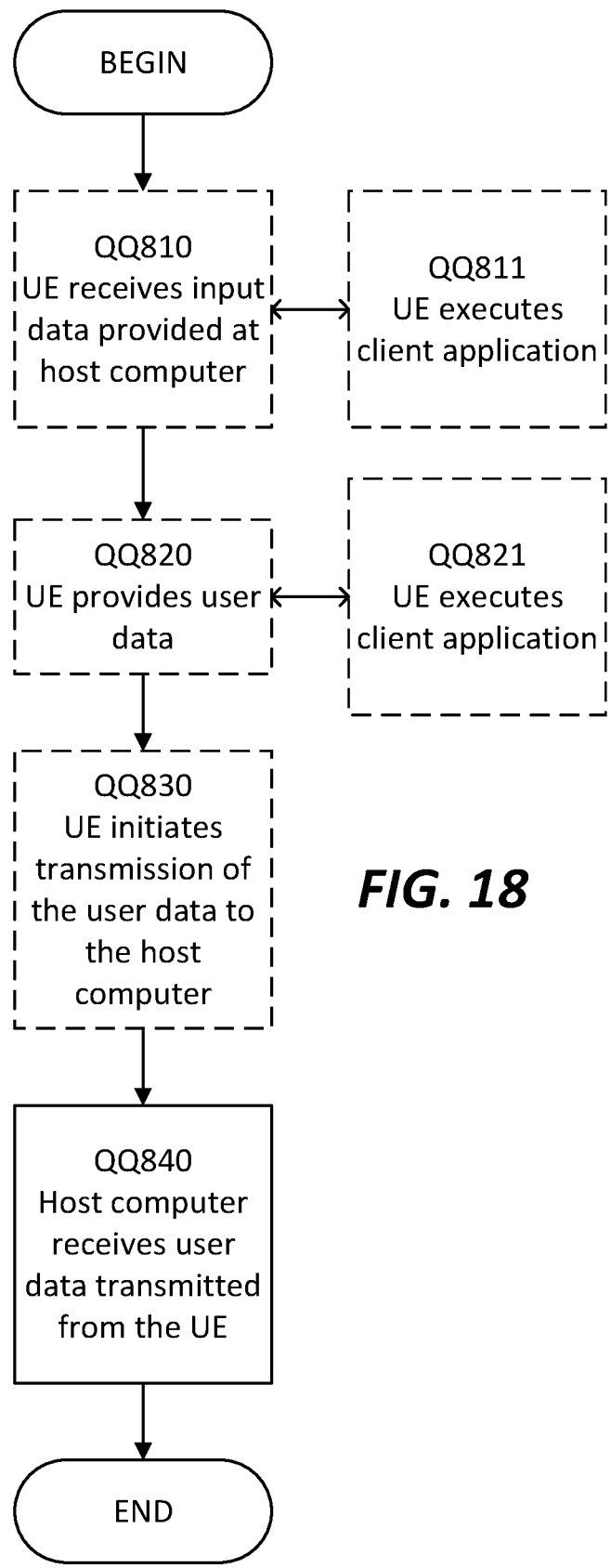
FIG. 18 is a block diagram of methods implemented in a communication system including a host computer, a base station, and a user equipment in accordance with some embodiments.

FIG. 18: Methods implemented in a communication system including a host computer, a base station and a user equipment in accordance with some embodiments.

FIG. 18 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 18 will be included in this section. In step QQ810 (which may be optional), the UE receives input data provided by the host computer. Additionally or alternatively, in step QQ820, the UE provides user data. In substep QQ821 (which may be optional) of step QQ820, the UE provides the user data by executing a client application. In substep QQ811 (which may be optional) of step QQ810, the UE executes a client application which provides the user data in reaction to the received input data provided by the host computer. In providing the user data, the executed client application may further consider user input received from the user. Regardless of the specific manner in which the user data was provided, the UE initiates, in substep QQ830 (which may be optional), transmission of the user data to the host computer. In step QQ840 of the method, the host computer receives the user data transmitted from the UE, in accordance with the teachings of the embodiments described throughout this disclosure.

Figure 19:
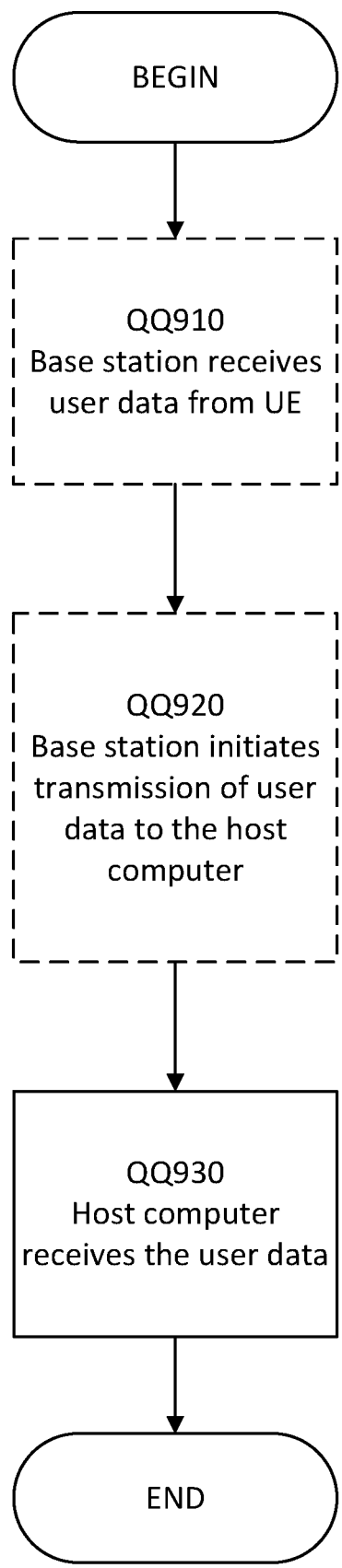
FIG. 19 is a block diagram of methods implemented in a communication system including a host computer, a base station, and a user equipment in accordance with some embodiments.

FIG. 19: Methods implemented in a communication system including a host computer, a base station and a user equipment in accordance with some embodiments.

FIG. 19 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 19 will be included in this section. In step QQ910 (which may be optional), in accordance with the teachings of the embodiments described throughout this disclosure, the base station receives user data from the UE. In step QQ920 (which may be optional), the base station initiates transmission of the received user data to the host computer. In step QQ930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

The invention claimed is:

1. A method by a user equipment, UE, in a wireless communication system, the method comprising:
receiving an access command from a source node, the access command instructing the UE to access a target cell and including an access configuration specifying an access method without random access and one or more valid target cell beams for which the access configuration is configured as valid at the target cell, one of:
the access configuration specifying one or more pre-allocated uplink transmission resource grants; and
the access configuration indicating that the UE should receive an uplink transmission resource grant in a downlink transmission in the target cell, the downlink transmission being associated with one of the one or more valid target cell beams in the target cell;

performing beam selection to select a target cell beam for communicating with the target cell;

determining if the selected target cell beam corresponds to at least one of the one or more valid target cell beams; and, in response to the access command, at least one of:

in response to determining that the selected target cell beam corresponds to at least one of the one or more valid target cell beams, accessing the target cell using the selected target cell beam and the access method without random access; and in response to determining that the selected target cell beam does not correspond to at least one of the one or more valid target cell beams, accessing the target cell using a random-access channel, RACH, based access procedure.

2. The method of claim 1, wherein accessing the target cell using the selected target cell beam comprises transmitting an access message to the target cell using a pre-allocated uplink transmission resource grant included in the access command.

3. The method of claim 2, wherein transmitting the access message comprises transmitting the access message via a physical uplink shared channel, PUSCH.

4. The method of claim 1, wherein the RACH-based access procedure comprises a contention-based random access.

5. The method of claim 1, wherein the RACH-based access procedure comprises a contention-free random access.

6. The method of claim 1, wherein the access configuration comprises a contention free random access, CFRA, configuration including one or more contention-free random access preamble(s) associated with one or more target cell beams in the target cell.

7. The method of claim 1, further comprising:

in response to determining that the selected target cell beam does not correspond to at least one of the one or more valid target cell beams, repeating beam selection until a beam is selected that corresponds to at least one of the one or more valid target cell beams.

8. The method of claim 1, wherein the access configuration specifies one or more pre-allocated uplink transmission resource grants and accessing the target cell comprises:

attempting to access to the target cell using the pre-allocated resource grant on one of the one or more valid target cell beams; and in response to failure of the attempt to access to the target cell using the pre-allocated resource grant on one of the one or more valid target cell beams, performing a random access channel, RACH, based access to the target cell.

9. The method of claim 1, wherein the access command comprises a radio resource control, RRC, message.

10. The method of claim 1, wherein the access command comprises one of an RRCConnection Reconfiguration message and an RRCReconfiguration message.

11. The method of claim 1, wherein the access command comprises a handover command, and wherein accessing the target cell comprises performing a handover to the target cell.

12. The method of claim 1, wherein the access command comprises a secondary cell group, SCG, modification command, and wherein accessing the target cell comprises performing an SCG modification at the target cell.

13. A user equipment, UE, comprising:

a processor circuit;

a transceiver coupled to the processor circuit; and a memory coupled to the processor circuit, the memory comprising machine readable program instructions that, when executed by the processor circuit, cause the UE to perform operations of:

receiving an access command from a source node, the access command instructing the UE to access a target cell and including an access configuration specifying an access method without random access and one or more valid target cell beams for which the access configuration is configured as valid at the target cell, one of:

the access configuration specifying one or more pre-allocated uplink transmission resource grants; and the access configuration indicating that the UE should receive an uplink transmission resource grant in a downlink transmission in the target cell, the downlink transmission being associated with one of the one or more valid target cell beams in the target cell;

performing beam selection to select a target cell beam for communicating with the target cell;

determining if the selected target cell beam corresponds to at least one of the one or more valid target cell beams; and, in response to the access command, at least one of:

in response to determining that the selected target cell beam corresponds to at least one of the one or more valid target cell beams, accessing the target cell using the selected target cell beam and the access method without random access; and in response to determining that the selected target cell beam does not correspond to at least one of the one or more valid target cell beams, accessing the target cell using a random-access channel, RACH, based access procedure.

14. A method by a node in a wireless communication system, the method comprising:

preparing an access command for instructing a user equipment, UE, to access a target cell, the access command including a random-access channel, RACH, less configuration specifying an access method without random access and one or more valid target cell beams for which the RACH-less configuration is configured as valid at the target cell, the one or more valid target cell beams being configured for non-RACH access by the UE, one of:

the access configuration specifying one or more pre-allocated uplink transmission resource grants; and the access configuration indicating that the UE should receive an uplink transmission resource grant in a downlink transmission in the target cell, the downlink transmission being associated with one of the one or more valid target cell beams in the target cell; and transmitting the access command toward the UE.

15. The method of claim 14, wherein preparing the access command and transmitting the access command are performed by the target cell.

16. The method of claim 14, wherein transmitting the access command comprises transmitting the access command to a source node to which the UE is connected.

17. The method of claim 16, wherein transmitting the access command to the source node comprises transmitting the access command in a transparent radio resource control, RRC, container.

18. The method of claim 14, wherein preparing the access command and transmitting the access command are performed by a source node to which the UE is connected.

19. The method of claim 18, further comprising:
informing the target cell of the transmission of the access command to the UE.

20. The method of claim 18, wherein the access command comprises a radio resource control, RRC, message.

21. The method of claim 18, wherein the access command comprises an RRCConnection Reconfiguration message.

22. The method of claim 14, wherein the access command comprises a handover command.

23. A network node, comprising:
a processor circuit;
a transceiver coupled to the processor circuit; and
a memory coupled to the processor circuit, the memory comprising machine readable program instructions that, when executed by the processor circuit, cause the network node to perform operations comprising operations of:

preparing an access command for instructing a user equipment, UE, to access a target cell, the access command including a random-access channel, RACH, less configuration specifying an access method without random access and one or more valid target cell beams for which the RACH-less configuration is configured as valid at the target cell, the one or more valid target cell beams being configured for non-RACH access by the UE, one of:
the access configuration specifying one or more pre-allocated uplink transmission resource grants; and
the access configuration indicating that the UE should receive an uplink transmission resource grant in a downlink transmission in the target cell, the downlink transmission being associated with one of the one or more valid target cell beams in the target cell; and
transmitting the access command toward the UE.

\* \* \* \* \*